US010494974B2

(12) United States Patent
Kawaguchi et al.

(10) Patent No.: US 10,494,974 B2
(45) Date of Patent: Dec. 3, 2019

(54) EXHAUST HEAT RECOVERY DEVICE

(71) Applicant: NGK INSULATORS, LTD., Nagoya (JP)

(72) Inventors: Tatsuo Kawaguchi, Nagoya (JP); Takeshi Sakuma, Nagoya (JP); Makoto Yoshihara, Nagoya (JP); Hiroshi Mizuno, Nagoya (JP); Daisuke Kimura, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/954,963

(22) Filed: Apr. 17, 2018

(65) Prior Publication Data
US 2018/0230884 A1 Aug. 16, 2018

Related U.S. Application Data

(63) Continuation of application No. PCT/JP2016/081330, filed on Oct. 21, 2016.

(30) Foreign Application Priority Data

Oct. 23, 2015 (JP) ................................. 2015-209356

(51) Int. Cl.
*F01N 5/02* (2006.01)
*F01N 3/24* (2006.01)
(Continued)

(52) U.S. Cl.
CPC ................. *F01N 5/02* (2013.01); *F01N 3/24* (2013.01); *F28F 13/003* (2013.01); *F28F 21/04* (2013.01); *F28F 27/02* (2013.01); *Y02T 10/16* (2013.01)

(58) Field of Classification Search
CPC .... F01N 5/02; F01N 3/24; F28F 21/04; F28F 13/003; F28F 27/02
(Continued)

(56) References Cited

U.S. PATENT DOCUMENTS 3,884,297 A * 5/1975 Fegraus ................ F01N 3/0205
165/145
4,248,297 A * 2/1981 Pei ........................ C03B 23/207
165/10
(Continued)

FOREIGN PATENT DOCUMENTS

JP H11-153025 A1 6/1999
JP 2007-315370 A1 12/2007
(Continued)

OTHER PUBLICATIONS

International Search Report and Written Opinion (Application No. PCT/JP2016/081330) dated Dec. 20, 2016.
(Continued)

*Primary Examiner* — Claire E Rojohn, III
(74) *Attorney, Agent, or Firm* — Burr & Brown, PLLC

(57) ABSTRACT

An exhaust heat recovery device including a heat exchange portion, an exhaust branch portion, and an exhaust distribution portion, wherein the heat exchange portion comprises a pillar-shaped honeycomb body having a first end face and a second end face, and a casing accommodating the honeycomb body, the exhaust branch portion has a branch path that branches a path of exhaust gas flowing into the honeycomb body into a central portion and an outer circumferential portion in a cross-section orthogonal to an axial direction of the honeycomb body, and the exhaust distribution portion has an exhaust distribution mechanism that adjusts a heat recovery amount by changing an airflow resistance of the path of the exhaust gas in the central portion of the honeycomb body and varying the exhaust amount passing through the path of the exhaust gas in the outer circumferential portion of the honeycomb body.

12 Claims, 17 Drawing Sheets

(51) Int. Cl.
  *F28F 13/00* (2006.01)
  *F28F 21/04* (2006.01)
  *F28F 27/02* (2006.01)

(58) Field of Classification Search
  USPC .......................................................... 165/51
  See application file for complete search history.

(56) References Cited

U.S. PATENT DOCUMENTS

| | | | | |
|---|---|---|---|---|
| 6,730,274 | B1* | 5/2004 | Ideguchi | F01N 3/0205 422/173 |
| 7,252,809 | B2* | 8/2007 | Bruck | F01N 3/2006 422/180 |
| 7,921,640 | B2* | 4/2011 | Major | F01N 5/025 165/51 |
| 8,327,634 | B2* | 12/2012 | Orihashi | F01N 3/055 165/51 |
| 8,402,757 | B2* | 3/2013 | Takeishi | F01N 5/02 60/274 |
| 8,424,296 | B2* | 4/2013 | Burgers | F01N 3/2889 60/298 |
| 8,443,593 | B2* | 5/2013 | Sloss | F01N 3/2889 137/625.41 |
| 8,453,430 | B2* | 6/2013 | Hodgson | F01N 3/01 60/275 |
| 8,656,710 | B2* | 2/2014 | Bell | F01N 3/043 165/51 |
| 9,003,784 | B2* | 4/2015 | Limbeck | H01L 35/30 136/201 |
| 9,127,894 | B2* | 9/2015 | Limbeck | F01N 3/043 |
| 9,279,623 | B2* | 3/2016 | Limbeck | F01N 3/043 |
| 9,617,905 | B2* | 4/2017 | Seon | F01P 3/00 |
| 9,664,087 | B2* | 5/2017 | Sloss | F01N 5/02 |
| 9,689,295 | B1* | 6/2017 | Uhrich | F02M 26/33 |
| 9,759,498 | B2* | 9/2017 | Kim | F28F 3/044 |
| 9,957,871 | B2* | 5/2018 | Uhrich | F01N 9/00 |
| 9,989,322 | B2* | 6/2018 | Cheadle | F28F 27/02 |
| 10,006,369 | B2* | 6/2018 | Kupiszewski | F02C 3/04 |
| 2005/0284623 | A1* | 12/2005 | Poole | F01N 5/02 165/242 |
| 2009/0049832 | A1* | 2/2009 | Hase | F01N 5/02 60/320 |
| 2011/0032678 | A1* | 2/2011 | Altman | H01L 23/373 361/709 |
| 2011/0120106 | A1* | 5/2011 | Bruck | F01N 3/2053 60/320 |
| 2011/0192141 | A1* | 8/2011 | Schepers | B01D 53/94 60/274 |
| 2012/0247732 | A1 | 10/2012 | Suzuki et al. | |
| 2013/0213620 | A1* | 8/2013 | Miyazaki | F28F 7/02 165/154 |
| 2014/0224466 | A1* | 8/2014 | Lin | B82Y 30/00 165/185 |
| 2014/0352286 | A1* | 12/2014 | Kato | F28F 27/00 60/320 |
| 2015/0118482 | A1* | 4/2015 | Kagawa | B32B 27/08 428/323 |
| 2015/0218997 | A1* | 8/2015 | Kato | F01N 5/02 165/103 |
| 2016/0003550 | A1* | 1/2016 | Tokuda | F28F 21/04 165/140 |
| 2016/0341489 | A1* | 11/2016 | Ichiyanagi | F01N 5/02 |

FOREIGN PATENT DOCUMENTS

| | | |
|---|---|---|
| JP | 2008-025557 A1 | 2/2008 |
| JP | 2008-069750 A1 | 3/2008 |
| JP | 2008-163773 A1 | 7/2008 |
| JP | 2008-232031 A1 | 10/2008 |
| JP | 2009-024565 A1 | 2/2009 |
| JP | 2009-144606 A1 | 7/2009 |
| JP | 2010-019216 A1 | 1/2010 |
| JP | 2013-130159 A1 | 7/2013 |
| JP | 2015-031250 A1 | 2/2015 |
| WO | 2006/090725 A1 | 8/2006 |
| WO | 2011/071161 A1 | 6/2011 |
| WO | 2014/025036 A1 | 2/2014 |
| WO | 2014/148584 A1 | 9/2014 |
| WO | 2015/114949 A1 | 8/2015 |

OTHER PUBLICATIONS

Chinese Office Action (Application No. 201680060898.9) dated Aug. 5, 2019.

* cited by examiner

EXHAUST HEAT RECOVERY DEVICE

TECHNICAL FIELD

The present invention relates to an exhaust heat recovery device. More specifically, the present invention relates to an exhaust heat recovery device that can be made compact, has a small pressure loss, and is excellent in recovery efficiency of exhaust heat.

BACKGROUND ART

Conventionally, various exhaust heat recovery devices provided in an exhaust system of an automobile or the like having an internal combustion engine and recovering exhaust heat are proposed (see, for example, Patent Documents 1 to 6). As such an exhaust heat recovery device, for example, a flow path of exhaust gas is configured to switch between a heat exchanger on an exhaust system and a bypass path bypassing the heat exchanger by opening and closing a valve body of the exhaust system according to an operating state of an internal combustion engine and a temperature of a medium (cooling water).

For example, Patent Document 1 discloses an exhaust heat recovery apparatus configured such that a temperature-operated actuator for opening a valve body when a temperature of a medium reaches a predetermined value or more is provided, and the valve body is configured to be opened when at least one of the flow rate of exhaust gas and the temperature of the medium is equal to or higher than a predetermined value. In the exhaust heat recovery apparatus configured as above, when the flow rate of the exhaust gas increases and reaches a predetermined value, the valve body is opened and the bypass path is opened, and the exhaust gas passes through the bypass path by bypassing the heat exchanger on the exhaust system. Therefore, in the exhaust heat recovery apparatus disclosed in Patent Literature 1, it is said that a flow resistance of the exhaust gas in the exhaust system can be reduced.

In addition, Patent Document 2 discloses an exhaust heat recovery apparatus configured such that exhaust gas passing through an exhaust pipe passes through a gap between an outer circumference of the exhaust pipe and a laminate, and then flows out through a gap between jacket elements to a downstream side from a gap between an inner circumference of a cylindrical shell and the laminate. Patent Document 3 discloses an exhaust heat recovery apparatus including an exhaust pipe, a heat exchanger, an exhaust port, an opening and closing means for opening and closing an outlet of the exhaust pipe, and a shell member for guiding exhaust gas discharged from the outlet and the discharge port to a downstream side. Patent Document 4 discloses an exhaust heat recovery apparatus including a heat exchanger which performs heat exchange between exhaust gas and a medium, and a bypass path by which exhaust gas bypasses the heat exchanger, in an exhaust system of an internal combustion engine or the like. Patent Document 5 discloses an exhaust heat recovery device including an exhaust heat recovery device body, a thermoactuator, and a recovery efficiency switching valve which is opened and closed to a recovery side or a non-recovery side in association with an operation of an output unit of the thermoactuator.

Patent Document 6 discloses a heat exchanger using a honeycomb structure as a first fluid circulating portion through which a heating body passes. The honeycomb structure has a plurality of cells which is defined and formed by ceramic partition walls and penetrates in an axial direction from one end face to the other end face and through which a heating body that is a first fluid passes.

In addition, conventionally, as an exhaust heat recovery device for recovering exhaust heat as described above, an exhaust heat recovery device including an exhaust gas recirculation (EGR) cooler has also been proposed (see, for example, Patent Documents 7 and 8).

CITATION LIST

Patent Documents

[Patent Document 1] WO 2006-090725
[Patent Document 2] JP-A-2013-130159
[Patent Document 3] WO 2014-025036
[Patent Document 4] JP-A-2015-031250
[Patent Document 5] JP-A-2010-019216
[Patent Document 6] WO 2011-071161
[Patent Document 7] JP-A-2008-163773
[Patent Document 8] JP-A-2008-232031

SUMMARY OF THE INVENTION

Problem to be Solved by the Invention

However, in the exhaust heat recovery apparatus disclosed in Patent Document 1, since heat recovery is performed by a heat exchange pipe or the like having a helical groove formed therein, it is necessary to lengthen the length of the device in a flow path direction so as to obtain a sufficient heat recovery efficiency Therefore, the exhaust heat recovery apparatus disclosed in Patent Document 1 has a problem that the size of the device is increased. The exhaust heat recovery apparatus disclosed in Patent Document 4 also has a problem that the size of the device is increased as in the exhaust heat recovery apparatus disclosed in Patent Document 1. In the exhaust heat recovery apparatuses having the configurations disclosed in Patent Documents 1 and 4, when the length of the device in the flow path direction is shortened, the heat recovery efficiency is lowered.

On the other hand, although the exhaust heat recovery apparatus disclosed in Patent Document 2 or the exhaust heat recovery device disclosed in Patent Document 5 can realize the miniaturization of the device, there is a problem that a pressure loss of an exhaust system is large.

As described above, conventionally, there have not been proposed exhaust heat recovery devices capable of sufficiently satisfying various problems such as the miniaturization of the device, the suppression of the increase in the pressure loss, and the improvement of the recovery efficiency of exhaust heat. Therefore, there has been a demand for development of an exhaust heat recovery device which can realize the miniaturization of the device, has a small pressure loss, and is excellent in the recovery efficiency of exhaust heat.

The present invention has been made in view of such problems. According to the present invention, there is provided an exhaust heat recovery device which can realize the miniaturization of the device, has a small pressure loss, and is excellent in the recovery efficiency of exhaust heat.

Means for Solving the Problem

In order to solve the above problems, the present invention provides the following exhaust heat recovery device.

[1] An exhaust heat recovery device including a heat exchange portion, an exhaust branch portion, and an exhaust distribution portion, wherein the heat exchange portion includes a pillar-shaped honeycomb body having a first end face and a second end face, and a casing accommodating the honeycomb body, the honeycomb body includes partition walls made of ceramic as a main component, and a plurality of cells extending from the first end face to the second end face and serving as a flow path of exhaust gas are defined and formed by the partition walls, the casing includes a cylindrical member arranged so as to be fitted to an outer circumferential surface of the honeycomb body, and a casing body arranged outside the cylindrical member, forming a path of a heat exchange medium for recovering exhaust heat by heat exchange with the exhaust gas, and including a heat exchange medium introduction port into which the heat exchange medium is introduced and a heat exchange medium discharge port from which the heat exchange medium is discharged, the exhaust branch portion has a branch path that branches the path of the exhaust gas flowing into the honeycomb body into a central portion and an outer circumferential portion in a cross-section orthogonal to an axial direction of the honeycomb body, and the exhaust distribution portion has an exhaust distribution mechanism that adjusts a heat recovery amount by changing an airflow resistance of the path of the exhaust gas in the central portion of the honeycomb body and varying the exhaust amount passing through the path of the exhaust gas in the outer circumferential portion of the honeycomb body.

[2] The exhaust heat recovery device according to [1], wherein the honeycomb body has a donut shape in which the central portion is hollow.

[3] The exhaust heat recovery device according to [2], wherein the donut-shaped honeycomb body has an inner wall structure that is continuous in a cylindrical shape inside the hollow.

[4] The exhaust heat recovery device according to any of [1] to [3], wherein at least one of the exhaust branch portion and the exhaust distribution portion includes a cylindrical exhaust guide member, and an end face of the exhaust guide member is arranged in a state of being in contact with an end face of the honeycomb body or in a state of being separated from the end face of the honeycomb body.

[5] The exhaust heat recovery device according to [4], wherein an interval between the exhaust guide member and the end face of the honeycomb body is 0.05 to 10 mm,

[6] The exhaust heat recovery device according to [2] or [3], wherein at least one of the exhaust branch portion and the exhaust distribution portion includes a cylindrical exhaust guide member, and the exhaust guide member is arranged so as to penetrate the hollow of the donut-shaped honeycomb body.

[7] The exhaust heat recovery device according to any of [4] to [6], wherein a value of D1/D2, which is a ratio of a diameter D1 of the honeycomb body to a diameter D2 of the exhaust guide member, is 1.1 to 7.

[8] The exhaust heat recovery device according to any of [1] to [7], wherein the heat exchange portion, the exhaust branch portion, and the exhaust distribution portion are configured to be separable from each other.

[9] The exhaust heat recovery device according to any of [1] to [8], wherein the exhaust gas that has passed through the outer circumferential portion of the honeycomb body and the exhaust gas that has passed through the central portion of the honeycomb body among the exhaust gases of which circulating paths are determined by the exhaust distribution mechanism are discharged from discharge ports of different paths on a downstream side of the honeycomb body.

[10] The exhaust heat recovery device according to any of [1] to [9], wherein the exhaust gas that has passed through the outer circumferential portion of the honeycomb body and the exhaust gas that has passed through the central portion of the honeycomb body among the exhaust gases of which circulating paths are determined by the exhaust distribution mechanism are merged on the downstream side of the honeycomb body and are discharged from a discharge port of the same circulating path.

[11] The exhaust heat recovery device according to any of [1] to [10], wherein the path of the exhaust gas in the outer circumferential portion of the honeycomb body is partially partitioned in two or more portions in an axial direction of the honeycomb body, and the exhaust gas introduced into the outer circumferential portion is folded back and circulated with respect to the axial direction of the honeycomb body.

[12] The exhaust heat recovery device according to any of [1] to [11], further including an external member provided around the casing and including a device accompanying heat generation, wherein the exhaust heat recovery device is configured to further recover heat generation in the external member and heat transfer from the exhaust gas to the external member with the heat exchange medium.

Effect of the Invention

An exhaust heat recovery device of the present invention can realize the miniaturization of the device, has a small pressure loss, and is excellent in the recovery efficiency of exhaust heat. That is, in the exhaust heat recovery device of the present invention, a heat exchange portion has a honeycomb body, and an exhaust branch portion connected to the heat exchange portion has a branch path that branches a path of exhaust gas flowing into the honeycomb body into a central portion and an outer circumferential portion. Therefore, it is possible to achieve excellent recovery efficiency of exhaust heat while achieving the miniaturization of the exhaust heat recovery device. In addition, the exhaust heat recovery device of the present invention has an exhaust distribution mechanism in which an exhaust distribution portion adjusts a heat recovery amount by changing an airflow resistance in the central portion of the honeycomb body and varying an exhaust amount passing through the outer circumferential portion of the honeycomb body. Therefore, it is possible to suppress an increase in pressure loss while realize the miniaturization of the exhaust heat recovery device in combination with the action and effect of the honeycomb body used for the heat exchange portion.

MODE FOR CARRYING OUT THE INVENTION

Figure 1:
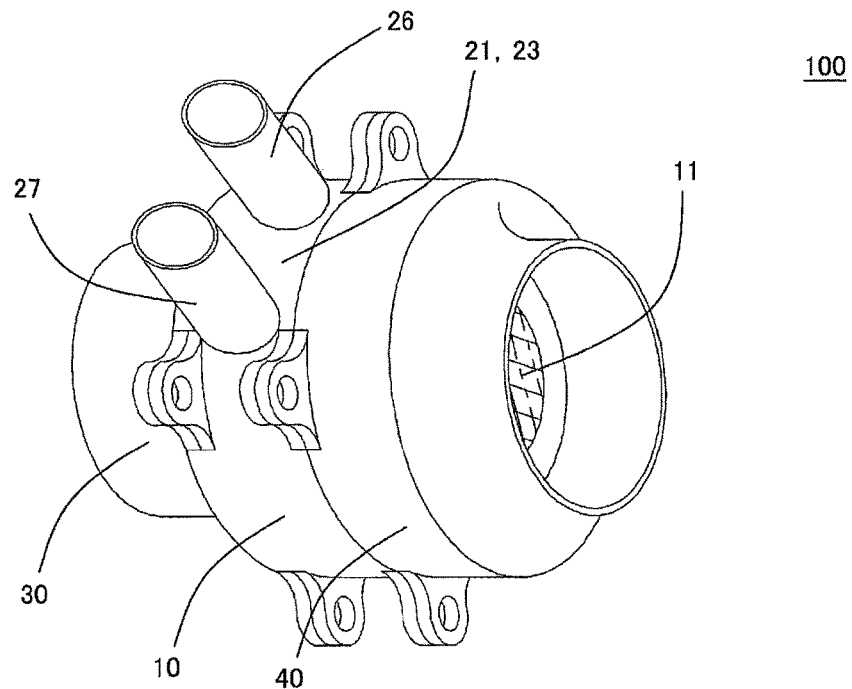
FIG. 1 is a perspective view schematically illustrating a first embodiment of an exhaust heat recovery device of the present invention.

Hereinafter, embodiments of the present invention will be specifically described with reference to the drawings. However, the present invention is not limited to the following embodiments, it will be understood that those in which changes, improvements, and the like have been appropriately added to the following embodiment fall within the scope of the present invention, based on the ordinary knowledge of those skilled in the art, without departing from the scope of the present invention.

(1) Exhaust Heat Recovery Device:

An exhaust heat recovery device of the present invention includes a heat exchange portion, an exhaust branch portion, and an exhaust distribution portion. The heat exchange portion has a pillar-shaped honeycomb body having a first end face and a second end face, and a casing accommodating the honeycomb body. The exhaust heat recovery device of the present invention is installed in an exhaust path of an internal combustion engine (hereinafter also referred to as an "exhaust system") and used for recovering exhaust heat of exhaust gas passing through the exhaust path. In the exhaust heat recovery device, a heat exchange medium for recovering exhaust heat by heat exchange with the exhaust gas is used. For example, in a case where the exhaust heat recovery device is mounted on an automobile, water or antifreeze (LLC specified by JIS K 2234) or the like can be used as the heat exchange medium.

The honeycomb body includes partition walls made of ceramic as a main component, and a plurality of cells extending from the first end face to the second end face and serving as a flow path of the exhaust gas are defined and formed by the partition walls. The casing includes a cylindrical member arranged so as to be fitted to the outer circumferential surface of the honeycomb body, and a casing body arranged outside the cylindrical member. The casing body forms the path of the heat exchange medium between the casing body and the cylindrical member. The casing body includes a heat exchange medium introduction port into which the heat exchange medium is introduced and a heat exchange medium discharge port from which the heat exchange medium is discharged.

The exhaust branch portion is connected to, for example, the first end face side of the honeycomb body of the heat exchange portion. The exhaust branch portion has a branch path. The branch path branches the path of the exhaust gas flowing into the honeycomb body into a central portion and an outer circumferential portion in a cross-section orthogonal to an axial direction of the honeycomb body. That is, in the exhaust heat recovery device of the present invention, the path of the exhaust gas flowing into the honeycomb body is branched into a "first path" in which the exhaust gas is guided to the central portion of the honeycomb body and a "second path" in which the exhaust gas is guided to the outer circumferential portion in the branch path.

The exhaust distribution portion is connected to, for example, the second end face side of the honeycomb body of the heat exchange portion. The exhaust distribution portion has an exhaust distribution mechanism. The exhaust distribution mechanism adjusts a heat recovery amount by changing an airflow resistance of the path of the exhaust gas in the central portion of the honeycomb body and varying the exhaust amount passing through the path of the exhaust gas in the outer circumferential portion of the honeycomb body. That is, when the airflow resistance of the central portion of the honeycomb structure is increased by the exhaust distribution mechanism, the exhaust gas flows more preferentially in the "second path" described above. On the other hand, when the airflow resistance of the central portion of the honeycomb body is reduced, the exhaust gas also flows in the "first path" described above. In this case, when the airflow resistance of the "first path" is lower than the airflow resistance of the "second path", the exhaust gas flows more preferentially in the "first path". Hereinafter, "the airflow resistance of the path of the exhaust gas in the central portion of the honeycomb body" may be simply referred to as "the airflow resistance in the central portion of the honeycomb body".

The exhaust heat recovery device of the present invention can realize the miniaturization of the device, has a small pressure loss, and is excellent in the recovery efficiency of the exhaust heat. That is, in the exhaust heat recovery device of the present invention, the heat exchange portion has the honeycomb body, and the exhaust branch portion connected to the heat exchange portion has the branch path that branches the path of the exhaust gas flowing into the honeycomb body into the central portion and the outer circumferential portion. Therefore, it is possible to achieve excellent recovery efficiency of exhaust heat while achieving the miniaturization of the exhaust heat recovery device. That is, by using the honeycomb body in which the plurality of cells are defined and formed by the partition walls, a contact area between the exhaust gas and the honeycomb body can be increased, and a heat transfer amount per unit volume can be significantly increased, as compared with the conventional exhaust heat recovery device. Then, the heat received by the honeycomb body is transferred to the heat exchange medium through the cylindrical member arranged so as to be fitted to the outer circumferential surface of the honeycomb body, thereby achieving excellent recovery efficiency of exhaust heat. As described above, since the heat transfer amount per unit volume can be increased, it is possible to reduce the length of the honeycomb body (the length in the flow direction of the exhaust gas) and to reduce the size of the exhaust heat recovery device. In addition, the exhaust heat recovery device of the present invention has the exhaust distribution mechanism in which the exhaust distribution portion adjusts the heat recovery amount by changing the airflow resistance in the central portion of the honeycomb body and varying the exhaust amount passing through the outer circumferential portion of the honeycomb body. Therefore, it is possible to suppress an increase in pressure loss while realize the miniaturization of the exhaust heat recovery device in combination with the action and effect of the honeycomb body used for the heat exchange portion.

In addition, unlike the conventional exhaust heat recovery device made of SUS, the exhaust heat recovery device of the present invention can spatially separate the exhaust gas from the heat exchange medium such as water, thereby realizing a simple structure.

Figure 2:
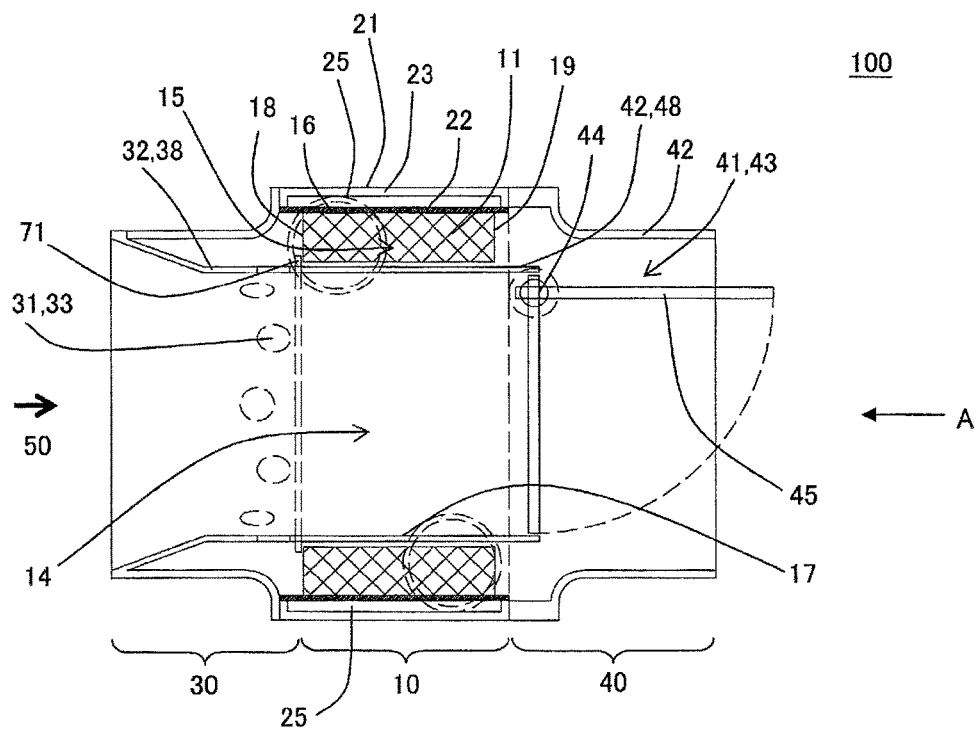
FIG. 2 is a cross-sectional view schematically illustrating the first embodiment of the exhaust heat recovery device of the present invention and is a cross-sectional view illustrating a cross-section parallel to a flow direction of an exhaust system.
Figure 3:
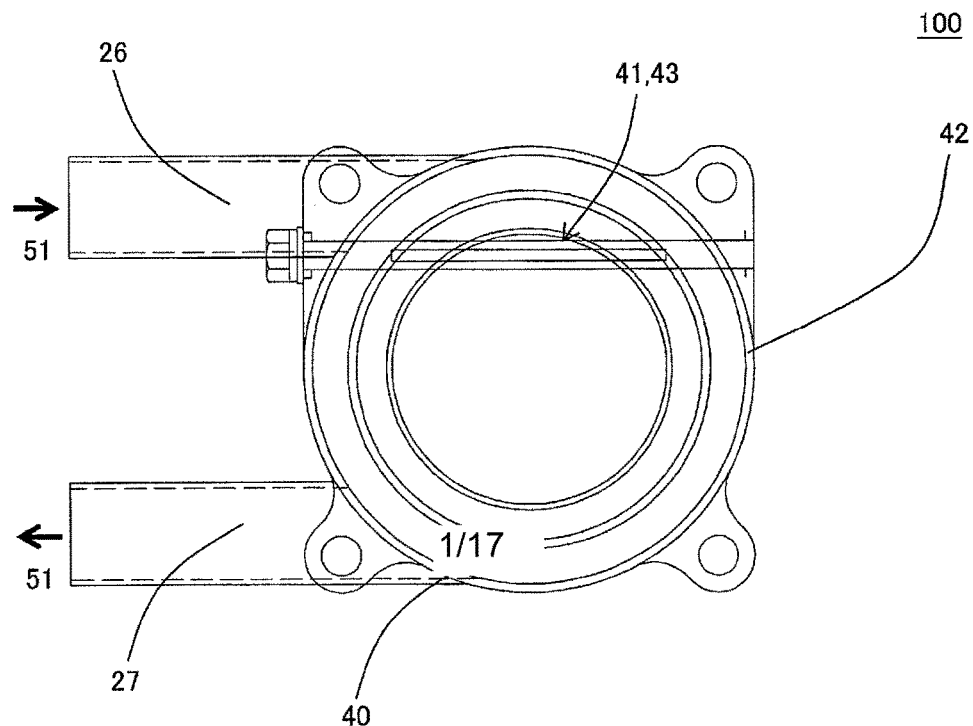
FIG. 3 is a plane view schematically illustrating the first embodiment of the exhaust heat recovery device of the present invention, and is a plane view of the exhaust heat recovery device illustrated in FIG. 2 when viewed in a direction of an arrow A.
Figure 4:
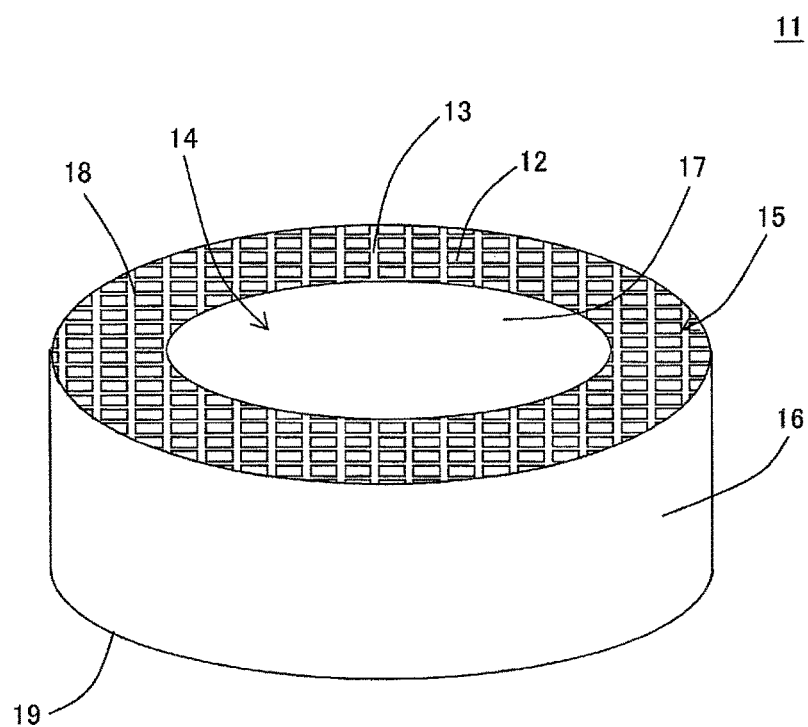
FIG. 4 is a perspective view schematically illustrating a honeycomb body used in the first embodiment of the exhaust heat recovery device of the present invention.

(1-1) First Embodiment of Exhaust Heat Recovery Device:

A first embodiment of an exhaust heat recovery device is an exhaust heat recovery device 100 illustrated in FIGS. 1 to 3. FIG. 1 is a perspective view schematically illustrating the first embodiment of the exhaust heat recovery device of the present invention. FIG. 2 is a cross-sectional view schematically illustrating the first embodiment of the exhaust heat recovery device of the present invention and is a cross-sectional view illustrating a cross-section parallel to a flow direction of an exhaust system. FIG. 3 is a plane view schematically illustrating the first embodiment of the exhaust heat recovery device of the present invention, and is a plane view of the exhaust heat recovery device illustrated in FIG. 2 when viewed in a direction of an arrow A. FIG. 4 is a perspective view schematically illustrating a honeycomb body used in the first embodiment of the exhaust heat recovery device of the present invention.

The exhaust heat recovery device 100 includes a heat exchange portion 10, an exhaust branch portion 30, and an exhaust distribution portion 40. The heat exchange portion 10 includes a pillar-shaped honeycomb body 11 having a first end face 18 and a second end face 19, and a casing 21 accommodating the honeycomb body 11. The honeycomb body 11 includes partition walls 13 made of ceramic as a main component, and a plurality of cells 12 extending from the first end face 18 to the second end face 19 and serving as a flow path of exhaust gas 50 are defined and formed by the partition walls 13. With such a configuration, the heat of the exhaust gas 50 passing through the cells 12 of the honeycomb body 11 can be efficiently collected and transmitted to the outside (specifically, a heat exchange medium 51).

An outer shape of the honeycomb body 11 is not particularly limited. A cross-sectional shape of the honeycomb body 11 in a cross-section orthogonal to an extending direction of the cells 12 may be a circular shape, an elliptical shape, a square shape, or other polygonal shapes. The honeycomb body 11 illustrated in FIG. 4 has a circular sectional shape in the cross-section orthogonal to the extending direction of the cells 12.

As described above, the partition walls 13 of the honeycomb body 11 are made of ceramic as a main component. The expression "made of ceramic as a main component" means "a mass ratio of the ceramic to a total mass of the partition walls 13 is 50 mass % or more".

As illustrated in FIG. 4, the honeycomb body 11 may have a donut shape in which a central portion 14 is hollow. In addition, the donut-shaped honeycomb body 11 may have an inner wall structure 17 in which the inside of the above-described hollow is continuous in a cylindrical shape. In the exhaust heat recovery device 100 illustrated in FIGS. 1 to 3, it is possible to further reduce the airflow resistance in the central portion 14 of the honeycomb body 11 by using the donut-shaped honeycomb body 11 as illustrated in FIG. 4. In particular, the central portion 14 of the honeycomb body 11 hardly contributes to the heat exchange with the exhaust gas and functions as a bypass of the path of the exhaust gas when it is intended to suppress the recovery of the exhaust heat. Therefore, it is possible to reduce the pressure loss of the exhaust heat recovery device 100 illustrated in FIGS. 1 to 3 by using the donut-shaped honeycomb body 11 having the hollow central portion 14. An outer circumferential portion 15 of the honeycomb body 11 has a honeycomb structure in which the plurality of cells 12 are defined and formed by the partition walls 13.

The inner wall structure 17 provided in the hollow of the central portion 14 may be, for example, a metallic pipe which is, for example, fitted in the hollow of the central portion 14. The inner wall structure 17 provided in the hollow of the central portion 14 may be made of ceramic having the same component as the partition wall 13 or different components from the partition wall 13.

As described above, in the case of arranging the metallic pipe in the hollow portion of the honeycomb body, it is preferable that the exhaust gas does not pass through the gap between the metallic pipe and the inner wall of the honeycomb body at the time of the heat recovery (that is, when the bypass is closed). For example, the following methods can be mentioned as a method of configuring the exhaust gas not to pass through the above-mentioned gap. As a first method, a method of filling a seal member in the above-described gap to prevent the exhaust gas from passing through the gap can be mentioned. As a second method, a method of providing a gap closing structure for closing the gap portion at the end portion on the first end face side (for example, inlet side) or the second end face side (for example, outlet side) of the honeycomb body to prevent the exhaust gas from passing through the gap can be mentioned. From the viewpoint of facilitating the division of the casing, in the second method, it is more preferable to provide the gap closing structure at the end portion of the inner wall of the honeycomb body. For example, in FIG. 2, an example in which a ring-shaped member 71 is arranged so as to abut on the end face of the first end face 18 side (inlet side) of the honeycomb body 11 is shown. By arranging such a ring-shaped member 71 on the first end face 18 side of the honeycomb body 11, it is possible to close the gap between the metallic pipe and the inner wall of the honeycomb body 11.

Figure 31:
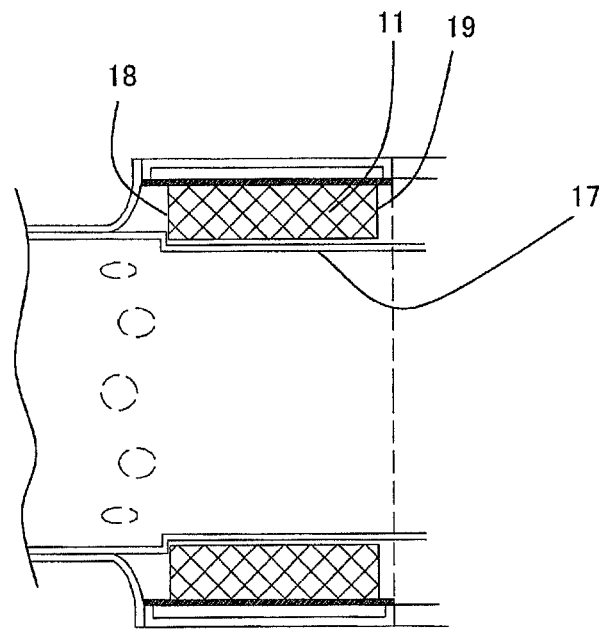
FIG. 31 is a cross-sectional view schematically illustrating another embodiment of an exhaust heat recovery device of the present invention and is a cross-sectional view illustrating a cross-section parallel to a flow direction of an exhaust system.

Here, another embodiment of the exhaust heat recovery device of the present invention will be described with reference to FIG. 31. FIG. 31 is a cross-sectional view schematically illustrating another embodiment of an exhaust heat recovery device of the present invention and is a cross-sectional view illustrating a cross-section parallel to a flow direction of an exhaust system. In the exhaust heat recovery device of the present embodiment, a metallic pipe constituting an inner wall structure 17 is formed in a convex shape on a first end face 18 side of a honeycomb body 11. Then, a hollow portion between the honeycomb body 11 and the pipe (specifically, the pipe constituting the inner wall structure 17) is closed by bringing a convex stepped portion of the pipe into close contact with or close to the first end face 18 of the honeycomb body 11. In FIG. 31, the metallic pipe constituting the inner wall structure 17 is formed in a convex shape, but for example, the metallic pipe can be formed in a tapered shape. The tapered portion may be brought into close contact with or close to the first end face of the honeycomb body so as to close the hollow portion between the honeycomb body and the pipe. In addition, it may be configured to close the hollow portion between the honeycomb body and the pipe by bringing the convex stepped portion of the pipe or the tapered portion in the tapered shape into close contact with or close to the second end face (outlet side) of the honeycomb body.

Figure 32:
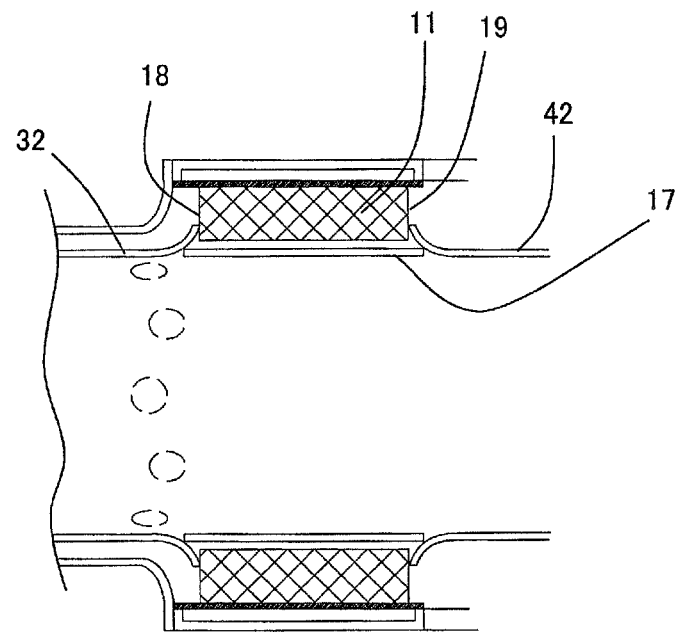
FIG. 32 is a cross-sectional view schematically illustrating further another embodiment of an exhaust heat recovery device of the present invention and is a cross-sectional view illustrating a cross-section parallel to a flow direction of an exhaust system.

In addition, further another embodiment of the exhaust heat recovery device of the present invention will be described with reference to FIG. 32. FIG. 32 is a cross-sectional view schematically illustrating further another embodiment of an exhaust heat recovery device of the present invention and is a cross-sectional view illustrating a cross-section parallel to a flow direction of an exhaust system. In the exhaust heat recovery device of the present embodiment, a metallic pipe 32 constituting an exhaust branch portion is formed in an expanded pipe shape on a first end face 18 side of a honeycomb body 11. Then, a hollow portion between the honeycomb body 11 and the pipe (specifically, the pipe constituting an inner wall structure 17) is closed by bringing the expanded-pipe-shaped portion of the pipe 32 into close contact with or close to the first end face 18 of the honeycomb body 11. In the exhaust heat recovery device of the present embodiment, a pipe 42 constituting an exhaust distribution portion is formed in an expanded pipe shape on a second end face 19 side of the honeycomb body 11. Then, a hollow portion between the honeycomb body 11 and the pipe is closed by bringing the expanded-pipe-shaped portion of the pipe 42 into close contact with or close to the second end face 19 of the honeycomb body 11. With respect to the pipe 32 constituting the exhaust branch portion and the pipe 42 constituting the exhaust distribution portion, at least one of the pipes may have an expanded pipe shape so as to close the above-mentioned hollow portion.

A porosity of the partition walls 13 is preferably 10% or less, more preferably 5% or less, and particularly preferably 3% or less. A thermal conductivity can be improved by setting the porosity of the partition walls 13 to 10% or less. The porosity of the partition walls 13 is a value measured by an Archimedes method.

The partition walls 13 preferably contain SiC (silicon carbide) having high thermal conductivity as a main component. It should be noted that the main component means that 50 mass % or more of the honeycomb body 11 is SiC.

More specifically, as the material of the honeycomb body 11, Si-impregnated SiC, (Si+Al) impregnated SiC, metal composite SiC, recrystallized SiC, $Si_3N_4$, SiC, or the like can be employed.

There is no particular limitation on the cell shape in the cross-section orthogonal to the extending direction of the cells 12 of the honeycomb body 11. A desired shape may be appropriately selected from among a circle, an ellipse, a triangle, a square, a hexagon, and other polygons.

A cell density (that is, the number of cells per unit area) of the honeycomb body 11 is not particularly limited. The cell density may be appropriately designed, but it is preferably in the range of 4 to 320 cells/$cm^2$. The strength of the partition walls and hence the strength and effective GSA (geometric surface area) of the honeycomb body itself can be made sufficient by setting the cell density to 4 cells/$cm^2$ or more. In addition, it is possible to prevent an increase in pressure loss when the exhaust gas 50 flows by setting the cell density to 320 cells/$cm^2$ or less. When the honeycomb body 11 has a donut shape, the cell density refers to a cell density in an outer circumferential portion 15 excluding a central portion 14.

An isostatic strength of the honeycomb body 11 is preferably 1 MPa or more, and more preferably 5 MPa or more. When the isostatic strength of the honeycomb body 11 is 1 MPa or more, the durability of the honeycomb body 11 can be made sufficient. An upper limit value of the isostatic strength of the honeycomb body 11 is about 100 MPa. The isostatic strength of the honeycomb body 11 can be measured according to a measurement method of an isostatic fracture strength defined in the JASO standard M505-87 which is an automobile standard issued by the Japan Automobile Manufacturers Association.

A diameter of the cross-section of the honeycomb body 11 orthogonal to the extending direction of the cells 12 is preferably 20 to 200 mm, and more preferably 30 to 100 mm. Hereinafter, the diameter of the cross-section of the honeycomb body 11 orthogonal to the extending direction of the cells 12 may be simply referred to as "a diameter of the honeycomb body 11". The heat recovery efficiency can be improved by adopting such a diameter. When the shape of the cross-section of the honeycomb body 11 is not circular, a diameter of a maximum inscribed circle inscribed in the cross-sectional shape of the honeycomb body 11 is taken as the diameter of the honeycomb body 11.

A thickness of the partition wall 13 of the honeycomb body 11 may be appropriately designed according to the purpose and is not particularly limited. The thickness of the partition wall 13 is preferably 0.1 to 1 mm, and more preferably 0.2 to 0.6 mm. By setting the thickness of the partition wall to 0.1 mm or more, it is possible to sufficiently improve the mechanical strength and to prevent breakage due to impact or thermal stress. In addition, by setting the thickness of the partition wall to 1 mm or less, it is possible to prevent problems such as an increase in pressure loss of the exhaust gas 50 and a reduction in heat recovery efficiency.

A thermal conductivity of the honeycomb body 11 is preferably 50 W/(m·K) or more, more preferably 100 to 300 W/(m·K), and particularly preferably 120 to 300 W/(m·K). By setting the thermal conductivity of the honeycomb body 11 to such a range, the thermal conductivity becomes favorable, and the heat inside the honeycomb body is efficiently transferred to a heat exchange medium 51 through a cylindrical member 22 arranged so as to be fitted to the honeycomb body. The value of thermal conductivity is a value measured by a laser flash method.

A catalyst may be carried on the partition walls 13 of the honeycomb body 11. When the catalyst is carried on the partition walls 13, it is possible to convert CO, $NO_x$, HC, or the like in the exhaust gas into harmless substances by a catalytic reaction, and in addition to this, it is possible to use heat of reaction generated during the catalytic reaction for heat exchange. Examples of the catalyst can include catalysts containing at least one element selected from the group consisting of a noble metal (platinum, rhodium, palladium, ruthenium, indium, silver, and gold), aluminum, nickel, zirconium, titanium, cerium, cobalt, manganese, zinc, copper, tin, iron, niobium, magnesium, lanthanum, samarium, bismuth, and barium. The above element may be contained as a metal simple substance, a metal oxide, and other metal compounds.

A carried amount of the catalyst (catalyst metal+carrier) is preferably 10 to 400 g/L, and a carried amount of the catalyst containing the noble metal is preferably 0.1 to 5 g/L. When the carried amount of the catalyst (catalyst metal+carrier) is 10 g/L or more, the catalytic action tends to occur. On the other hand, when the carried amount of the catalyst is 400 g/L or less, the pressure loss can be suppressed and the increase in manufacturing cost can be suppressed. The carrier is a carrier on which the catalyst metal is carried. The carrier preferably contains at least one member selected from the group consisting of alumina, ceria, and zirconia.

The casing 21 includes a cylindrical member 22 arranged so as to be fitted to the outer circumferential surface 16 of the honeycomb body 11, and a casing body 23 arranged outside the cylindrical member 22. As the cylindrical member 22, for example, an annular plate member can be used. A material of the cylindrical member 22 constituting the casing 21 is preferably a metal, for example, stainless steel, a titanium alloy, a copper alloy, an aluminum alloy, brass, or the like. In this specification, "to be fitted" means that the honeycomb body 11 and the cylindrical member 22 are fixed in a mutually fitted state. Therefore, the fitting between the honeycomb body 11 and the cylindrical member 22 is not limited to a fitting method such as a clearance fit, an interference fit, a shrink fit, or the like, and for example, the honeycomb body 11 and the cylindrical member 22 may be fixed to each other by brazing, diffusion bonding, or the like.

Examples of the material of the casing body 23 may include a metal, ceramic, and the like. As the metal, for example, stainless steel, a titanium alloy, a copper alloy, an aluminum alloy, brass, or the like can be used. The casing body 23 forms a path 25 of the heat exchange medium 51 for recovering exhaust heat from heat exchange with the exhaust gas 50. The casing body 23 includes a heat exchange medium introduction port 26 into which the heat exchange medium 51 is introduced and a heat exchange medium discharge port 27 from which the heat exchange medium 51 is discharged. It is preferable that at least a pair of the heat exchange medium introduction port 26 and the heat exchange medium discharge port 27 is formed in the casing body 23.

The exhaust branch portion 30 is connected to the first end face 18 side of the honeycomb body 11 of the heat exchange portion 10. The exhaust branch portion 30 has a branch path 31 that branches the path of the exhaust gas 50 flowing into the honeycomb body 11 into the central portion 14 and the outer circumferential portion 15 in the cross-section orthogonal to the axial direction of the honeycomb body 11. The "central portion 14" of the honeycomb body 11 means a region on the center side including a center axis of the honeycomb body 11 in the pillar-shaped honeycomb body 11. The "outer circumferential portion 15" of the honeycomb body 11 means a region on the outer circumferential side of the central portion 14 of the honeycomb body 11 in the pillar-shaped honeycomb body 11. In the exhaust heat recovery device 100 illustrated in FIG. 2, a through-hole 33 is formed in a pipe 32 constituting the exhaust branch portion 30, and the through-hole 33 is a branch path 31. When the exhaust gas 50 flowing through the path (pipe 32) of the exhaust gas 50 flows into the honeycomb body 11 without passing through the through-hole 33, the exhaust gas 50 flows into the central portion 14 of the honeycomb body 11. On the other hand, when the exhaust gas 50 flowing through the path (pipe 32) of the exhaust gas 50 passes through the through-hole 33, the exhaust gas 50 flows into the second flow path formed outside the pipe 32, and then, the exhaust gas 50 flows into the outer circumferential portion 15 of the honeycomb body 11. In the exhaust branch portion 30, the pipe 32 for causing the exhaust gas 50 to flow into the central portion 14 of the honeycomb body may be referred to as a "exhaust guide member 38".

A value of D1/D2, which is a ratio of a diameter D1 of the honeycomb body to a diameter D2 of the exhaust guide member 38 of the exhaust branch portion 30, is preferably 1.1 to 7, more preferably 1.15 to 2.3, and particularly preferably 1.15 to 1.75. When the value of D1/D2 is less than 1.1, an opening area of the outer circumferential portion 15 of the honeycomb body 11 is relatively small at the time of the heat recovery (for example, in a state in which an on-off valve 43 is closed), and the pressure loss of the exhaust gas 50 when flowing through the outer circumferential portion 15 may increase. When the value of D1/D2 exceeds 7, the pressure loss when the exhaust gas 50 flows through the central portion 14 may increase at the time of non-heat recovery (for example, in a state in which the on-off valve 43 is opened). In particular; when the opening area of the central portion 14 is relatively small, the pressure loss at the time of high load increases, leading to a reduction in engine output. The "diameter D1 of the honeycomb body" means a diameter in the cross-section of the honeycomb body orthogonal to the extending direction of the cells. The "diameter D2 of the exhaust guide member 38" means an inner diameter of the pipe 32 corresponding to the exhaust guide member 38.

The branch path 31 of the exhaust branch portion 30 is not limited to the through-hole 33 as illustrated in FIG. 2. For example, as the branch path 31 of the exhaust branch portion 30, the gas flow of the exhaust gas 50 is branched into at least two systems, and the exhaust gas 50 is individually introduced into the central portion 14 and the outer circumferential portion 15 of the honeycomb body 11. In addition, the exhaust gas 50 having passed through the branch path 31 and branched into two systems may maintain an airtight state with respect to each other. However, even if most of each gas flows are maintained, the gas may be transferred between the exhaust gases 50 branched into two systems.

The exhaust distribution portion 40 is connected to the second end face 19 side of the honeycomb body 11 of the heat exchange portion 10. The exhaust distribution portion 40 has an exhaust distribution mechanism 41 that adjusts a recovery amount of the exhaust heat (heat recovery amount) by changing an airflow resistance in the central portion 14 of the honeycomb body 11 and varying an exhaust amount passing through the outer circumferential portion 15 of the honeycomb body 11. In the exhaust heat recovery device 100 illustrated in FIG. 2, an on-off valve 43 is provided in a portion corresponding to the central portion 14 of the honeycomb body 11 in the pipe 42 constituting the exhaust distribution portion 40, and the on-off valve 43 is an exhaust distribution mechanism 41. When the on-off valve 43 is closed, the airflow resistance in the central portion 14 of the honeycomb body 11 increases, and the amount of the exhaust gas flowing to the outer circumferential portion 15 of the honeycomb body 11 increases. On the other hand, when the on-off valve 43 is opened, the airflow resistance in the central portion 14 of the honeycomb body 11 decreases, and the amount of the exhaust gas flowing to the outer circumferential portion 15 of the honeycomb body 11 decreases. Therefore, in the exhaust heat recovery device 100 illustrated in FIG. 2, when it is intended to promote the recovery of the exhaust heat, the on-off valve 43 is closed, and when it is intended to suppress the recovery of the exhaust heat, the on-off valve 43 is opened. In this manner, the heat recovery amount can be adjusted as necessary. The on-off valve 43 illustrated in FIG. 2 opens and closes the valve by moving the valve body 45 around a valve rod 44 by 90° in a direction parallel to the gas flow from an orthogonal direction. The opening and closing mechanism of the on-off valve 43 is not limited to the on-off valve 43 illustrated in FIG. 2. In the exhaust distribution portion 40, the pipe 42 for circulating the exhaust gas 50 flowing out from the central portion 14 of the honeycomb body may be referred to as an "exhaust guide member".

A value of D1/D2', which is a ratio of a diameter D1 of the honeycomb body to a diameter D2' of the exhaust guide member 48 of the exhaust distribution portion 40, is preferably 1.1 to 7, more preferably 1.15 to 2.3, and particularly preferably 1.15 to 1.75. When the value of D1/D2' is less than 1.1, an opening area of the outer circumferential portion 15 of the honeycomb body 11 is relatively small at the time of the heat recovery (for example, in a state in which an on-off valve 43 is closed), and the pressure loss of the exhaust gas 50 when flowing through the outer circumferential portion 15 may increase. When the value of D1/D2' exceeds 7, the pressure loss when the exhaust gas 50 flows through the central portion 14 may increase at the time of non-heat recovery (for example, in a state in which the on-off valve 43 is opened). In particular, when the opening area of the central portion 14 is relatively small, the pressure loss at the time of high load increases, leading to a reduction in engine output. The "diameter D2 of the exhaust guide member 48" means an inner diameter of the pipe 42 corresponding to the exhaust guide member 48.

In the exhaust heat recovery device 100 illustrated in FIGS. 1 to 3, the heat exchange portion 10, the exhaust branch portion 30, and the exhaust distribution portion 40 may be separable from each other. With such a configuration, for example, when a part of the constituent elements of the exhaust heat recovery device 100 is broken, without replacing the entire exhaust heat recovery device 100, any one of the heat exchange portion 10, the exhaust branch portion 30, and the exhaust distribution portion 40 can be partially replaced. In addition, the exhaust heat recovery device 100 itself may also be configured to be detachable from the exhaust system. With such a configuration, maintenance and the like of the exhaust heat recovery device 100 are facilitated.

The exhaust gas that has passed through the outer circumferential portion 15 of the honeycomb body 11 and the exhaust gas that has passed through the central portion 14 of the honeycomb body 11, among the exhaust gases of which the circulating paths are determined by the exhaust distribution mechanism 41, may be joined at the downstream side of the second end face 19 of the honeycomb body 11. The exhaust gases joined on the downstream side of the second end face 19 of the honeycomb body 11 are discharged from the discharge port of the same distribution path.

(Method of Manufacturing Exhaust Heat Recovery Device)

Next, a method of manufacturing an exhaust heat recovery device will be described. The exhaust heat recovery device of the present invention can be manufactured, for example, as follows. First, a clay containing a ceramic powder is extruded into a desired shape to prepare a honeycomb formed body. As a material of the honeycomb formed body, it is possible to use a ceramic listed as a preferable material for partition walls of a honeycomb body. For example, in the case of manufacturing the honeycomb body made of a Si-impregnated SiC composite material as a main component, first, a predetermined amount of a SiC powder, a binder, and water or an organic solvent are kneaded to prepare a clay, and the obtained clay is molded, thereby manufacturing the honeycomb formed body having a desired shape. Then, the produced honeycomb formed body is dried, and a honeycomb body in which a plurality of cells are defined and formed by partition walls is obtained by impregnating and firing metallic Si in the honeycomb formed body in an inert gas under reduced pressure or a vacuum. The honeycomb body may be hollowed out at the central portion thereof and may have a donut shape. In the case of hollowing out the central portion of the honeycomb body, it may be performed in a state of the honeycomb formed body or in a state of the fired body (honeycomb body) after firing.

Next, the honeycomb body is inserted into a cylindrical member made of stainless steel, and the cylindrical member is fitted to the honeycomb body by shrinkage fitting. Besides the shrinkage fitting, press fitting, brazing, diffusion bonding, or the like may be used for fitting the honeycomb body and the cylindrical member.

Next, a casing body which is made of stainless steel and forms a part of the casing is produced. Next, the honeycomb body and the cylindrical member arranged so as to be fitted to the honeycomb body are arranged inside the produced casing body. The casing is produced by joining the casing body and the cylindrical member. In this way, a heat exchange portion having the honeycomb body and the casing accommodating the honeycomb body is produced.

In addition, an exhaust branch portion and an exhaust distribution portion are produced. For example, first, the exhaust branch portion is provided with an outer pipe that can be connected to one end portion of the heat exchange portion (an end portion on the first end face side of the honeycomb body) and an inner pipe corresponding to the size of the central portion of the honeycomb body. A through-hole to be a branch path is formed in the inner pipe. A double pipe structure obtained by arranging an inner pipe inside an outer pipe can be the exhaust branch portion. For example, first, the exhaust distribution portion is provided with an outer pipe that can be connected to the other end portion of the heat exchange portion (an end portion on the second end face side of the honeycomb body) and an inner pipe corresponding to the size of the central portion of the honeycomb body. Then, an on-off valve is arranged in the inner pipe. A double pipe structure obtained by arranging an inner pipe inside an outer pipe can be the exhaust distribution portion.

The exhaust branch portion, the heat exchange portion, and the exhaust distribution portion, which are produced, are connected in series in the flow direction of the exhaust gas to manufacture an exhaust heat recovery device. The connection of the exhaust branch portion, the heat exchange portion, and the exhaust distribution portion may be performed in a separable manner, or may be performed in a non-separable manner. The method of manufacturing the exhaust heat recovery device is not limited to the above-described method, and appropriately changes, improvement, or the like can be made according to the configuration of the exhaust heat recovery device of each embodiment.

Figure 5:
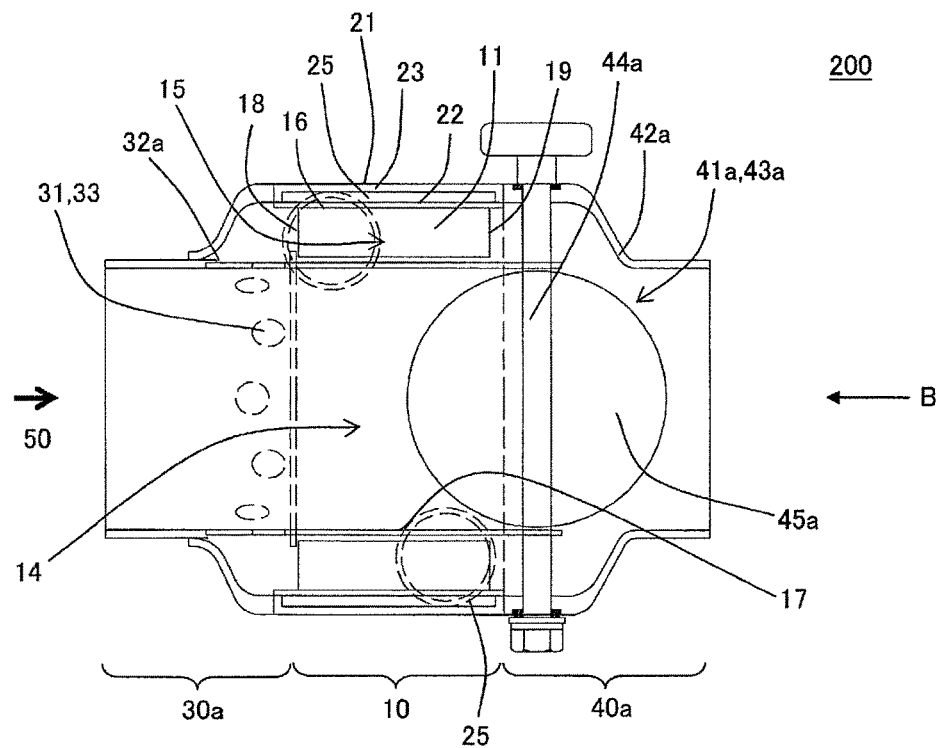
FIG. 5 is a cross-sectional view schematically illustrating a second embodiment of an exhaust heat recovery device of the present invention and is a cross-sectional view illustrating a cross-section parallel to a flow direction of an exhaust system.
Figure 6:
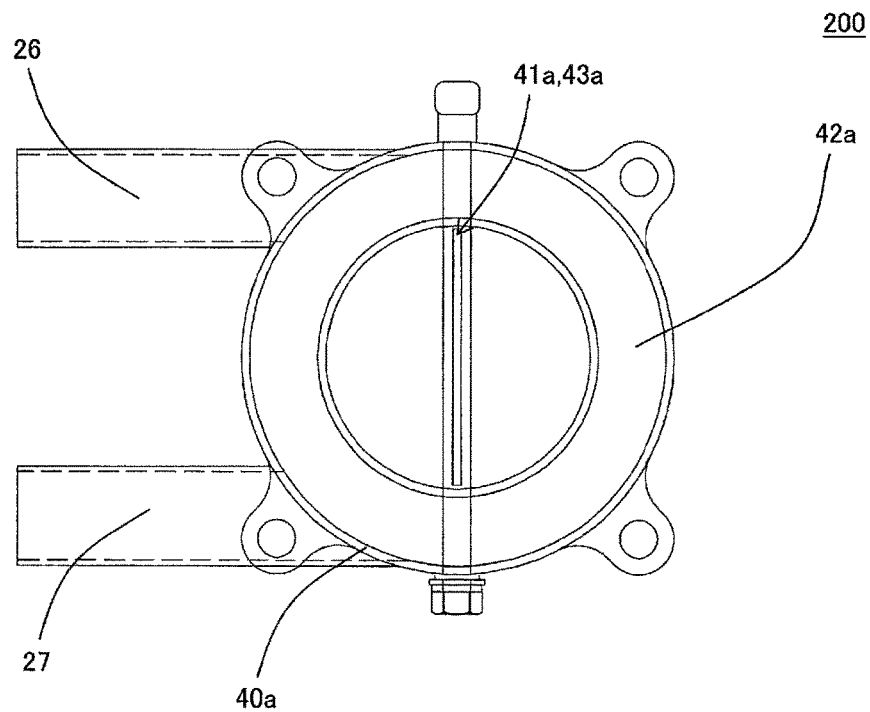
FIG. 6 is a plane view schematically illustrating the second embodiment of the exhaust heat recovery device of the present invention, and is a plane view of the exhaust heat recovery device illustrated in FIG. 5 when viewed in a direction of an arrow B.

(1-2) Second Embodiment of Exhaust Heat Recovery Device:

A second embodiment of an exhaust heat recovery device is an exhaust heat recovery device 200 illustrated in FIGS. 5 and 6. FIG. 5 is a cross-sectional view schematically illustrating a second embodiment of an exhaust heat recovery device of the present invention and is a cross-sectional view illustrating a cross-section parallel to a flow direction of an exhaust system. FIG. 6 is a plane view schematically illustrating the second embodiment of the exhaust heat recovery device of the present invention, and is a plane view of the exhaust heat recovery device illustrated in FIG. 5 when viewed in a direction of an arrow B. In the exhaust heat recovery device 200 illustrated in FIGS. 5 and 6, those constituted in the same manner as those of the exhaust heat recovery device 100 illustrated in FIGS. 1 to 3 are denoted by the same reference numerals and the description thereof may be omitted.

The exhaust heat recovery device 200 includes a heat exchange portion 10, an exhaust branch portion 30*a*, and an exhaust distribution portion 40*a*. The heat exchange portion 10 is configured in the same manner as the heat exchange portion 10 of the exhaust heat recovery device 100 illustrated in FIGS. 1 to 3. The exhaust branch portion 30*a* is configured in the same manner as the exhaust branch portion 30 of the exhaust heat recovery device 100 illustrated in FIGS. 1 to 3. The diameter of the pipe 32 in the "exhaust branch portion 30" illustrated in FIG. 2 gradually decreases in the flow direction of the exhaust gas, whereas the diameter of the pipe 32*a* in the "exhaust branch portion 30*a* " illustrated in FIG. 5 is constant. The "exhaust branch portion 30*a* " illustrated in FIG. 5 may be configured as the "exhaust branch portion 30 " illustrated in FIG. 2.

In the exhaust heat recovery device 200 illustrated in FIGS. 5 and 6, an exhaust distribution mechanism 41*a* of the exhaust distribution portion 40*a* has an on-off valve 43*a* configured such that a valve body 45*a* rotates around a valve rod 44*a* arranged so as to traverse a pipe 42*a*. When the on-off valve 43*a* is opened, a part of the valve body 45*a* protrudes into the heat exchange portion 10. However, since the central portion 14 of the honeycomb body 11 is hollow, the valve body 45*a* and the honeycomb body 11 will never contact each other. According to the exhaust heat recovery device 200 configured as described above, it is possible to achieve the same operational effects as those of the exhaust heat recovery device 100 illustrated in FIGS. 1 to 3 and to further reduce the size of the exhaust heat recovery device 200.

Figure 7:
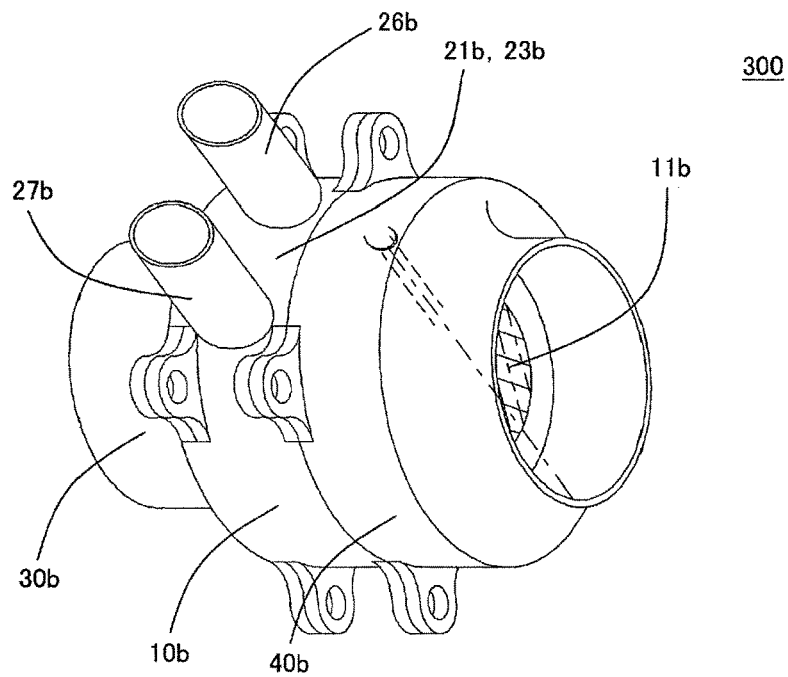
FIG. 7 is a perspective view schematically illustrating a third embodiment of an exhaust heat recovery device of the present invention.
Figure 8:
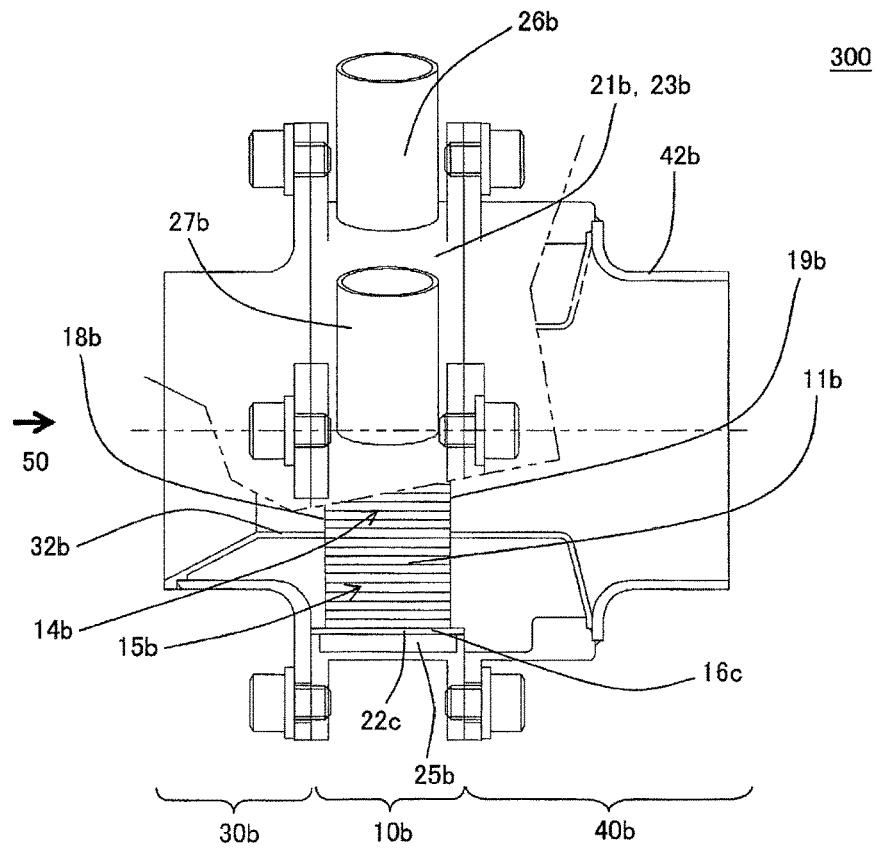
FIG. 8 is a partial cutout side view schematically illustrating the third embodiment of the exhaust heat recovery device of the present invention.
Figure 9:
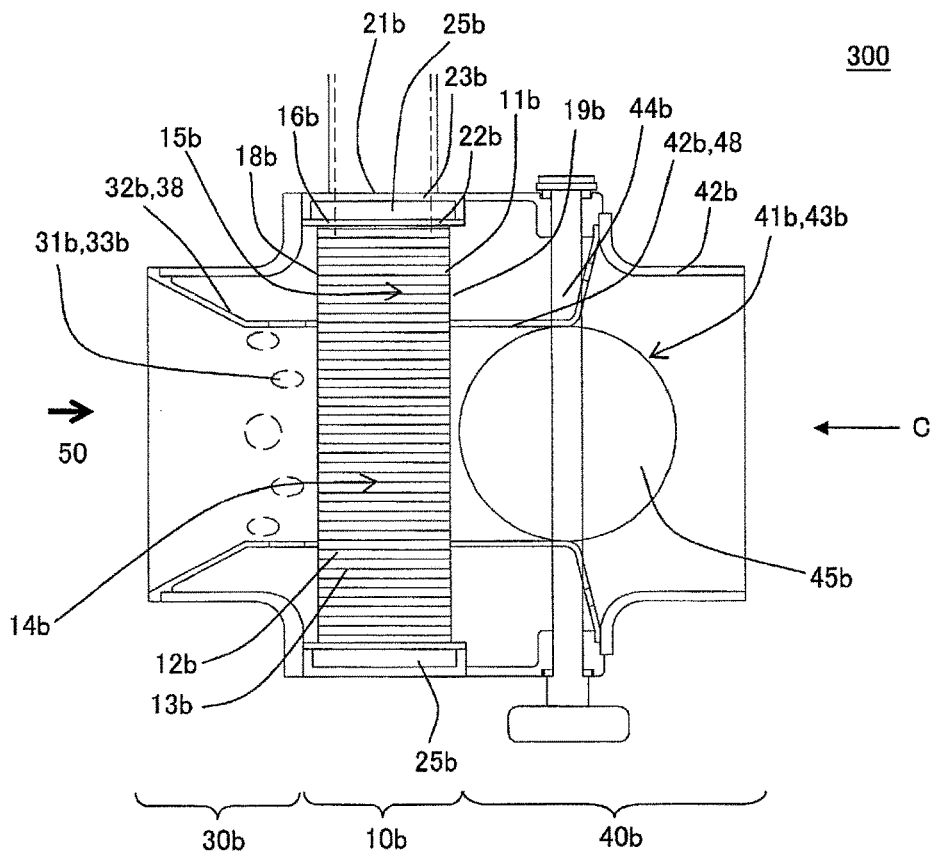
FIG. 9 is a cross-sectional view schematically illustrating the third embodiment of the exhaust heat recovery device of the present invention and is a cross-sectional view illustrating a cross-section parallel to a flow direction of an exhaust system.
Figure 10:
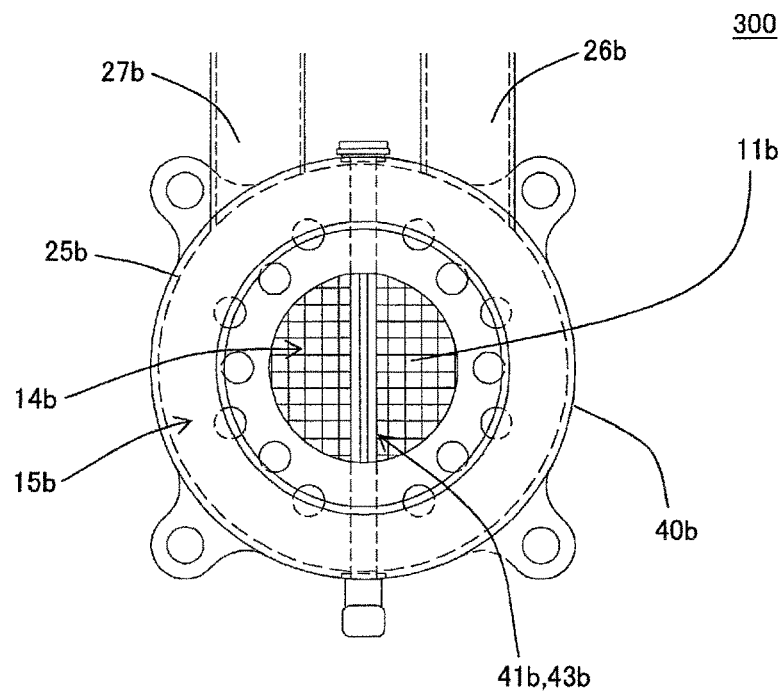
FIG. 10 is a plane view schematically illustrating the third embodiment of the exhaust heat recovery device of the present invention, and is a plane view of the exhaust heat recovery device illustrated in FIG. 9 when viewed in a direction of an arrow C.
Figure 11:
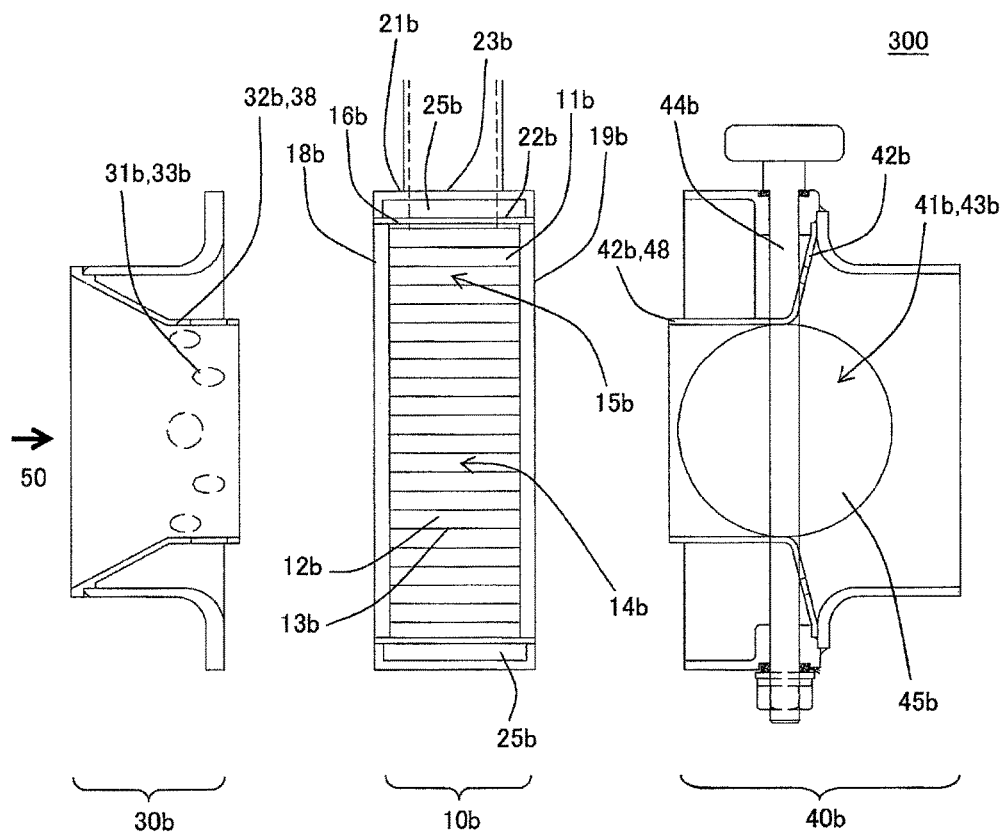
FIG. 11 is a cross-sectional view illustrating a state in which a heat exchange portion, an exhaust branch portion, and an exhaust distribution portion of the exhaust heat recovery device illustrated in FIG. 9 are separated.
Figure 12:
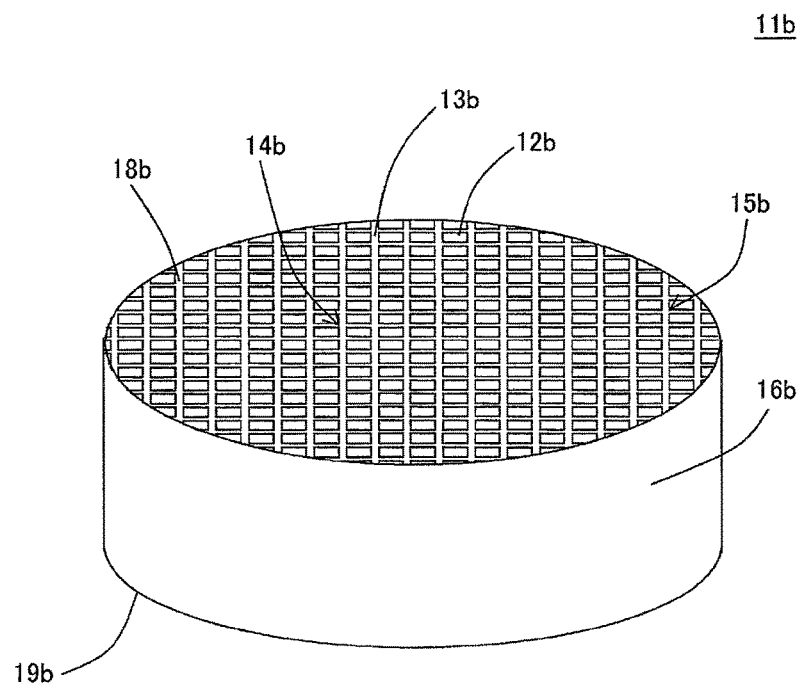
FIG. 12 is a perspective view schematically illustrating a honeycomb body used in the third embodiment of the exhaust heat recovery device of the present invention.

(1-3) Third Embodiment of Exhaust Heat Recovery Device:

A third embodiment of an exhaust heat recovery device is an exhaust heat recovery device 300 illustrated in FIGS. 7 to 11. FIG. 7 is a perspective view schematically illustrating a third embodiment of an exhaust heat recovery device of the present invention. FIG. 8 is a partial cutout side view schematically illustrating the third embodiment of the exhaust heat recovery device of the present invention. FIG. 9 is a cross-sectional view schematically illustrating the third embodiment of the exhaust heat recovery device of the present invention and is a cross-sectional view illustrating a cross-section parallel to a flow direction of an exhaust system. FIG. 10 is a plane view schematically illustrating the third embodiment of the exhaust heat recovery device of the present invention, and is a plane view of the exhaust heat recovery device illustrated in FIG. 9 when viewed in a direction of an arrow C. FIG. 11 is a cross-sectional view illustrating a state in which a heat exchange portion, an exhaust branch portion, and an exhaust distribution portion of the exhaust heat recovery device illustrated in FIG. 9 are separated. FIG. 12 is a perspective view schematically illustrating a honeycomb body used in the third embodiment of the exhaust heat recovery device of the present invention.

The exhaust heat recovery device 300 includes a heat exchange portion 10b, an exhaust branch portion 30b, and an exhaust distribution portion 40b. The heat exchange portion 10b includes a pillar-shaped honeycomb body 11b having a first end face 18b and a second end face 19b, and a casing 21b accommodating the honeycomb body 11b. The honeycomb body 11b includes partition walls 13b made of ceramic as a main component, and a plurality of cells 12b extending from the first end face 18b to the second end face 19b and serving as a flow path of exhaust gas 50 are defined and formed by the partition walls 13b. With such a configuration, the heat of the exhaust gas 50 passing through the cells 12b of the honeycomb body 11b can be efficiently collected and transmitted to the outside (specifically, a heat exchange medium 51).

An outer shape of the honeycomb body 11b is not particularly limited. A cross-sectional shape of the honeycomb body 11b in a cross-section orthogonal to an extending direction of the cells 12b may be a circular shape, an elliptical shape, a square shape, or other polygonal shapes. The honeycomb body 11b illustrated in FIG. 12 has a circular sectional shape in the cross-section orthogonal to the extending direction of the cells 12b. In the honeycomb body 11b illustrated in FIG. 12, both the central portion 14b and the outer circumferential portion 15b have a honeycomb structure in which a plurality of cells 12b are defined and formed by partition walls 13b. It is preferable that the shape of the honeycomb body 11b is the same as that of the honeycomb body 11 illustrated in FIG. 4, except that it is not a hollow donut shape.

The casing 21b includes a cylindrical member 22b arranged so as to be fitted to the outer circumferential surface 16b of the honeycomb body 11b, and a casing body 23b arranged outside the cylindrical member 22b. As the cylindrical member 22b, for example, an annular plate member can be used. A material of the cylindrical member 22b constituting the casing 21b is preferably a metal, for example, stainless steel, a titanium alloy, a copper alloy, an aluminum alloy, brass, or the like.

Examples of the material of the casing body 23b may include a metal, ceramics, and the like. As the metal, for example, stainless steel, a titanium alloy, a copper alloy, an aluminum alloy, brass, or the like can be used. The casing body 23b forms a path 25b of the heat exchange medium 51. The casing body 23b includes a heat exchange medium introduction port 26b into which the heat exchange medium 51 is introduced and a heat exchange medium discharge port 27b from which the heat exchange medium 51 is discharged. It is preferable that at least a pair of the heat exchange medium introduction port 26b and the heat exchange medium discharge port 27b is formed in the casing body 23b.

The exhaust branch portion 30b is connected to the first end face 18b side of the honeycomb body 11b of the heat exchange portion 10b. The exhaust branch portion 30b has a branch path 31b that branches the path of the exhaust gas 50 flowing into the honeycomb body 11b into the central portion 14b and the outer circumferential portion 15b in the cross-section orthogonal to the axial direction of the honeycomb body 11b. In the exhaust heat recovery device 300 illustrated in FIG. 9, a through-hole 33b is formed in a pipe 32b constituting the exhaust branch portion 30b, and the through-hole 33b is a branch path 31b. When the exhaust gas 50 flowing through the path (pipe 32b) of the exhaust gas 50 flows into the honeycomb body 11b without passing through the through-hole 33b, the exhaust gas 50 flows into the central portion 14b of the honeycomb body 11b. On the other hand, when the exhaust gas 50 flowing through the path (pipe 32b) of the exhaust gas 50 passes through the through-hole 33b, the exhaust gas 50 flows into the second flow path formed outside the pipe 32b, and then, the exhaust gas 50 flows into the outer circumferential portion 15b of the honeycomb body 11b.

The exhaust distribution portion 40b is connected to the second end face 19b side of the honeycomb body 11b of the heat exchange portion 10b. The exhaust distribution portion 40b has an exhaust distribution mechanism 41b that adjusts a recovery amount of the exhaust heat (heat recovery amount) by changing an airflow resistance in the central portion 14b of the honeycomb body 11b and varying an exhaust amount passing through the outer circumferential portion 15b of the honeycomb body 11b. In the exhaust heat recovery device 300 illustrated in FIG. 9, an on-off valve 43b is provided in a portion corresponding to the central portion 14b of the honeycomb body 11b in the pipe 42b constituting the exhaust distribution portion 40b, and the on-off valve 43b is an exhaust distribution mechanism 41b.

In the exhaust heat recovery device 300, the configurations of the branch path 31b of the exhaust branch portion 30b and the exhaust distribution mechanism 41b of the exhaust distribution portion 40b is the same as those of the exhaust heat recovery devices of the first and second embodiments.

In the exhaust heat recovery device 300, as illustrated in FIG. 11, the heat exchange portion 10b, the exhaust branch portion 30b, and the exhaust distribution portion 40b are separable from each other.

In the exhaust heat recovery device 300, it is preferable that at least one of the exhaust branch portion 30b and the exhaust distribution portion 40b includes cylindrical exhaust guide members 38 and 48 (for example, pipes 32b and 42b), and the exhaust guide members 38 and 48 do not penetrate the honeycomb body 11b. That is, it is preferable that the end portions of the exhaust guide members 38 and 48 are arranged in a state of being in contact with the end face of the honeycomb body 11b, or in a state of being separated from the end face of the honeycomb body 11b. With such a configuration, as illustrated in FIG. 11, the heat exchange portion 10b, the exhaust branch portion 30b, and the exhaust distribution portion 40b can be easily separable from each other.

In addition, although not illustrated, in a case where at least one of the exhaust branch portion and the exhaust distribution portion includes a cylindrical exhaust guide member, the exhaust guide member may be arranged so as to penetrate the hollow of the donut-shaped honeycomb body 11 as illustrated in FIG. 4. With such a configuration, a continuous path of the exhaust gas is formed so as to penetrate the hollow of the donut-shaped honeycomb body 11.

A value of D1/D2, which is a ratio of a diameter D1 of the honeycomb body to a diameter D2 of the exhaust guide members 38 and 48, is preferably 1.1 to 7, more preferably 1.15 to 2.3, and particularly preferably 1.15 to 1.75. When the value of D1/D2 is less than 1.1, an opening area of the outer circumferential portion 15b of the honeycomb body 11b is relatively small at the time of the heat recovery (for example, in a state in which an on-off valve 43b is closed), and the pressure loss of the exhaust gas 50 when flowing through the outer circumferential portion 15b may increase. When the value of D1/D2 exceeds 7, the pressure loss when the exhaust gas 50 flows through the central portion 14b may increase at the time of non-heat recovery (for example, in a state in which the on-off valve 43b is opened). In particular, when the opening area of the central portion 14b is relatively small, the pressure loss at the time of high load increases, leading to a reduction in engine output in some cases.

In a case where the end portions of the exhaust guide members 38 and 48 are arranged in a state of being separated from the end face of the honeycomb body 11b, a distance (in other words, an interval) between the end portions of the exhaust guide members 38 and 48 and the end face of the honeycomb body 11b is preferably 0.05 to 10 mm. With such a configuration, a contact between the exhaust guide members 38 and 48 and the honeycomb body 11b can be suppressed when the exhaust guide members 38 and 48 and the honeycomb body 11b are thermally expanded, so that breakage of the honeycomb body 11b or the like can be effectively prevented. The distance between the end portions of the exhaust guide members 38 and 48 and the end face of the honeycomb body 11b is more preferably 0.05 to 5 mm, and more preferably 0.05 to 2 mm.

Figure 13:
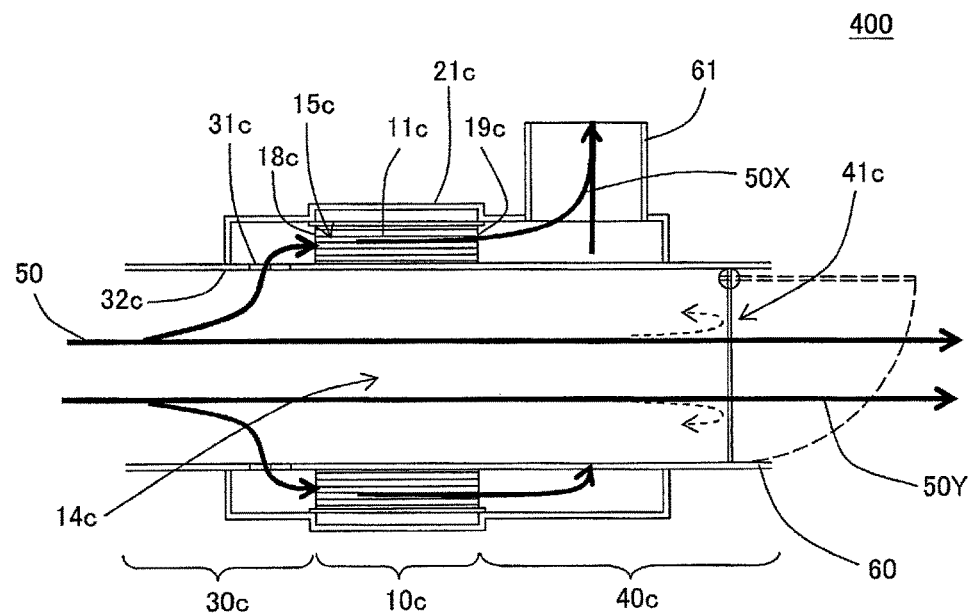
FIG. 13 is a cross-sectional view schematically illustrating a fourth embodiment of an exhaust heat recovery device of the present invention and is a cross-sectional view illustrating a cross-section parallel to a flow direction of an exhaust system.

(1-4) Fourth Embodiment of Exhaust Heat Recovery Device:

A fourth embodiment of an exhaust heat recovery device is an exhaust heat recovery device 400 illustrated in FIG. 13. FIG. 13 is a cross-sectional view schematically illustrating a fourth embodiment of an exhaust heat recovery device of the present invention and is a cross-sectional view illustrating a cross-section parallel to a flow direction of an exhaust system.

The exhaust heat recovery device 400 includes a heat exchange portion 10c, an exhaust branch portion 30c, and an exhaust distribution portion 40c. The heat exchange portion 10c includes a honeycomb body 11c and a casing 21c. The exhaust branch portion 30c has a branch path 31c. The exhaust distribution portion 40c has an exhaust distribution mechanism 41c. The constituent elements of the honeycomb body 11c, the casing 21c, the branch path 31c, and the exhaust distribution mechanism 41c are configured in the same manner as the constituent elements of the exhaust heat recovery devices of the first to third embodiments. In FIG. 13, reference numeral 18c represents a "first end face" of the honeycomb body, and reference numeral 32c represents a "pipe" of the exhaust branch portion 30c.

In the exhaust heat recovery device 400, the gas flow of the exhaust gas 50, the circulating path of which is determined by the exhaust distribution mechanism 41c, is different from the gas flow of the exhaust heat recovery devices of the first to third embodiments. That is, in the exhaust heat recovery device 400, the exhaust gas 50X that has passed through the outer circumferential portion 15c of the honeycomb body 11c and the exhaust gas 50Y that has passed through the central portion 14c of the honeycomb body 11c are discharged from discharge ports 60 and 61 of different paths. The discharge ports 60 and 61 are discharge ports provided on the downstream side of the second end face 19c of the honeycomb body 11c, so as to discharge the exhaust gas 50.

The exhaust heat recovery device 400 can be suitably used as an EGR (exhaust gas recirculation) cooler. In addition, the exhaust gas 50X and the exhaust gas 50Y are configured to be discharged from the discharge ports 60 and 61 of the different paths, respectively, so that the exhaust heat recovery is possible even when the EGR is not operated. Furthermore, it is possible to prevent excessive heat recovery when the heat recovery is unnecessary. For example, it is possible to effectively separate the exhaust gas 50 and the heat exchange medium (for example, cooling water) and prevent excessive heat recovery. Specifically, when the heat recovery is unnecessary, the exhaust gas 50Y is actively passed through the central portion 14c of the honeycomb body 11c, thereby reducing the exhaust amount of the exhaust gas 50X passing through the outer circumferential portion 15c of the honeycomb body 11c. This makes it possible to reduce an absolute amount of the exhaust gas 50 exchanging heat with the heat exchange medium and prevent excessive heat recovery. On the other hand, when it is intended to increase the heat recovery amount, the exhaust amount of the exhaust gas 50X is increased by appropriately decreasing the exhaust amount of the exhaust gas 50Y by using the exhaust distribution mechanism 41c, thereby securing the necessary heat recovery amount.

Figure 14:
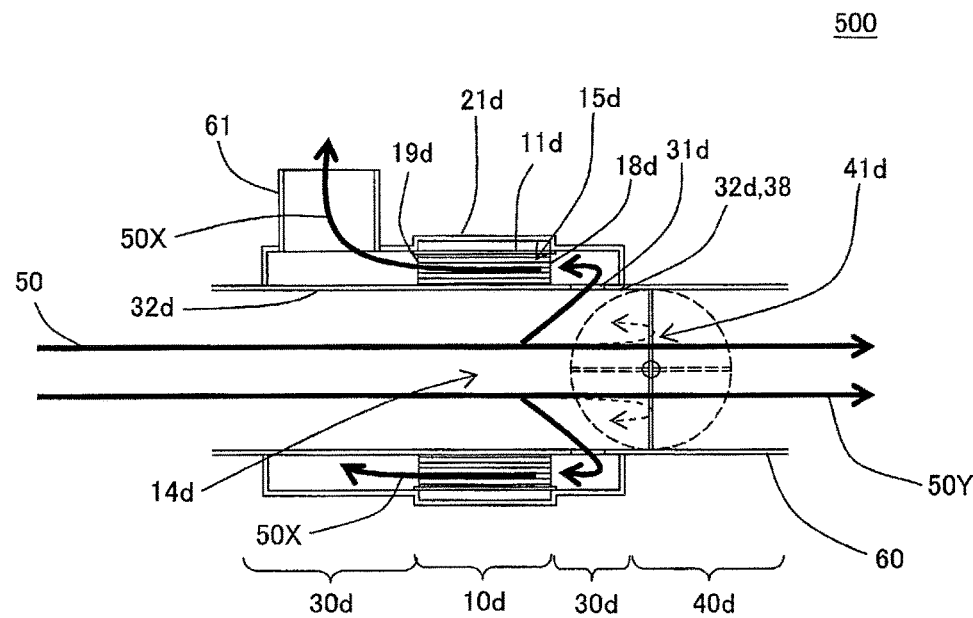
FIG. 14 is a cross-sectional view schematically illustrating a fifth embodiment of an exhaust heat recovery device of the present invention and is a cross-sectional view illustrating a cross-section parallel to a flow direction of an exhaust system.

(1-5) Fifth Embodiment of Exhaust Heat Recovery Device:

A fifth embodiment of an exhaust heat recovery device is an exhaust heat recovery device 500 illustrated in FIG. 14. FIG. 14 is a cross-sectional view schematically illustrating a fifth embodiment of an exhaust heat recovery device of the present invention and is a cross-sectional view illustrating a cross-section parallel to a flow direction of an exhaust system.

The exhaust heat recovery device 500 includes a heat exchange portion 10d, an exhaust branch portion 30d, and an exhaust distribution portion 40d. The heat exchange portion 10d includes a honeycomb body 11d and a casing 21d. The honeycomb body 11d has a first end face 18d and a second end face 19d, and the central portion 14d has a hollow donut shape. The exhaust branch portion 30d has a branch path 31d. The exhaust distribution portion 40d has an exhaust distribution mechanism 41d. The honeycomb body 11d and the casing 21d can be, for example, configured in the same manner as the honeycomb body 11 and the casing 21 in the exhaust heat recovery device of the first embodiment as illustrated in FIG. 2. A pipe 32d (exhaust guide member 38) used for the exhaust branch portion 30d is provided so as to penetrate the central portion 14d of the honeycomb body 11d. A branch path 31d including a through-hole is provided on the downstream side of the pipe 32d penetrating the central portion 14d of the honeycomb body 11d. In addition, an exhaust distribution mechanism 41d of the exhaust distribution portion 40d is further provided on the downstream side of the pipe 32d passing through the central portion 14d of the honeycomb body 11d. Like the exhaust distribution mechanisms of the exhaust heat recovery devices of the first to third embodiments, the exhaust distribution mechanism 41d is constituted by an on-off valve and can change an airflow resistance in the central portion 14d of the honeycomb body 11d by operating the on-off valve.

In the exhaust heat recovery device 500, the gas flow of the exhaust gas 50, the circulating path of which is determined by the exhaust distribution mechanism 41d, is different from the gas flow of the exhaust heat recovery devices of the first to third embodiments. That is, in the exhaust heat recovery device 500, first, the entire amount of the exhaust gas 50 once passes through the central portion 14d of the honeycomb body 11d. At least a part of the exhaust gas 50Y after passing through the central portion 14d is branched by the branch path 31d, and the branched exhaust gas 50X flows through the outer circumferential portion 15d of the honeycomb body 11d. The exhaust distribution mechanism 41d is provided on the downstream side of the branch path 31d, and the exhaust amount of the exhaust gas 50X flowing through the outer circumferential portion 15d of the honeycomb body 11d can be adjusted by changing the airflow resistance of the central portion 14d of the honeycomb body 11d.

In the exhaust heat recovery device 500, the exhaust gas 50X that has passed through the outer circumferential portion 15d of the honeycomb body 11d and the exhaust gas 50Y that has passed through the central portion 14d of the honeycomb body 11d and has not been branched to the outer circumferential portion 15d are discharged from discharge ports 60 and 61 of different paths. The discharge ports 60 and 61 are discharge ports provided on the downstream side of the honeycomb body 11d, so as to discharge the exhaust gas 50.

Like the exhaust heat recovery device 400 of the fourth embodiment (see FIG. 13), the exhaust heat recovery device 500 can be suitably used as an EGR (exhaust gas recirculation) cooler. In addition, the exhaust gas 50X and the exhaust gas 50Y are configured to be discharged from the discharge ports 60 and 61 of the different paths, respectively, so that the exhaust heat recovery is possible even when the EGR is not operated. Furthermore, it is possible to prevent excessive heat recovery when the heat recovery is unnecessary. For example, it is possible to effectively separate the exhaust gas 50 and the heat exchange medium (for example, cooling water) and prevent excessive heat recovery.

Figure 15:
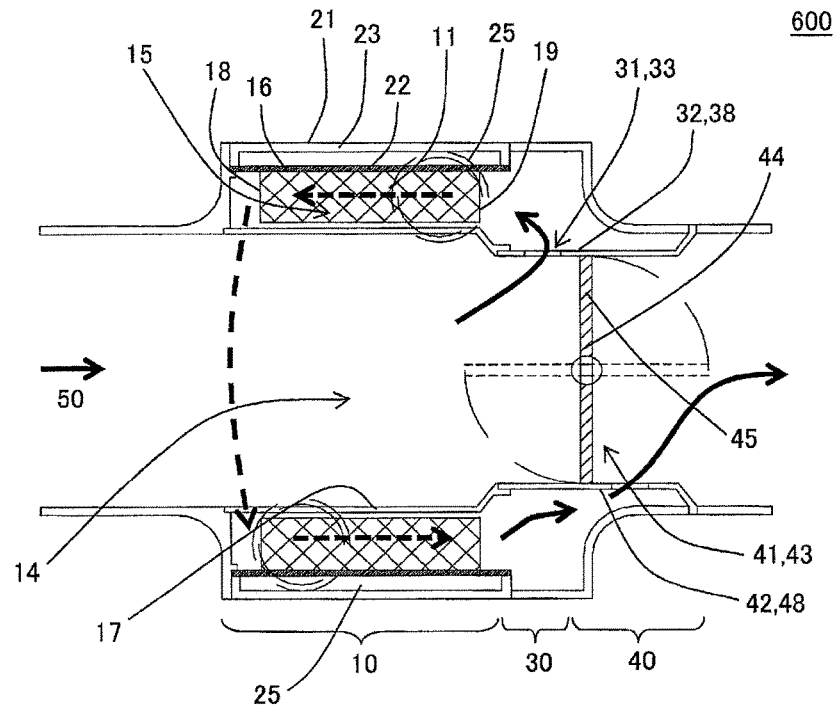
FIG. 15 is a cross-sectional view schematically illustrating a sixth embodiment of an exhaust heat recovery device of the present invention and is a cross-sectional view illustrating a cross-section parallel to a flow direction of an exhaust system.

(1-6) Sixth Embodiment of Exhaust Heat Recovery Device:

A sixth embodiment of an exhaust heat recovery device is an exhaust heat recovery device 600 illustrated in FIG. 15. FIG. 15 is a cross-sectional view schematically illustrating a sixth embodiment of an exhaust heat recovery device of the present invention and is a cross-sectional view illustrating a cross-section parallel to a flow direction of an exhaust system. In the exhaust heat recovery device 600 illustrated in FIG. 15, those constituted in the same manner as those of the exhaust heat recovery device 100 illustrated in FIGS. 1 to 3 are denoted by the same reference numerals and the description thereof may be omitted.

The exhaust heat recovery device 600 includes a heat exchange portion 10, an exhaust branch portion 30, and an exhaust distribution portion 40. In the exhaust heat recovery device 600, the path of the exhaust gas 50 in the outer circumferential portion 15 of the honeycomb body 11 is partially partitioned into two or more portions in the axial direction of the honeycomb body 11. In the exhaust heat recovery device 600, the exhaust gas 50 introduced into the outer circumferential portion 15 of the honeycomb body 11 is configured to be folded back and circulated with respect to the axial direction of the honeycomb body 11. That is, like the exhaust heat recovery device 500 of the fifth embodiment (FIG. 14), in the exhaust heat recovery device 600 illustrated in FIG. 15, a branch path 31 having a through-hole is provided on the downstream side passing through the central portion 14 of the honeycomb body 11. In the exhaust heat recovery device 600 of the present embodiment, the path of the exhaust gas 50 in the outer circumferential portion 15 of the honeycomb body 11 is partitioned into two portions in the axial direction of the honeycomb body 11 at approximately the middle portion of the paper surface of FIG. 15 in the vertical direction. However, the path of the exhaust gas 50 is not partitioned on the upstream side of the outer circumferential portion 15 of the honeycomb body 11 (that is, on the left side of the paper surface), and the exhaust gas 50 that has passed through the upper half of the honeycomb body 11 flows into the lower half of the honeycomb body 11 on the upstream side. The exhaust gas 50 that has flowed into the lower half of the honeycomb body 11 passes through the lower half of the honeycomb body 11 and then merges with the exhaust gas 50 that has passed through the central portion 14 of the honeycomb body 11.

In exhaust heat recovery device 600, since the exhaust gas 50 passing through the outer circumferential portion 15 is folded back and circulated in the axial direction of the honeycomb body 11, the heat recovery efficiency can be increased. For example, in a case where the outer circumferential portion 15 of the honeycomb body 11 is partitioned into two portions in the axial direction, the length of the exhaust gas 50 in the outer circumferential portion 15 of the honeycomb body 11 can be twice the axial length of the honeycomb body 11. Therefore, the exhaust heat recovery device 600 of the present embodiment can be expected to improve heat recovery efficiency by about 1.5 times, as compared with the exhaust heat recovery device in which the length of the honeycomb body 11 in the axial direction is the same and which is not folded back. In addition, it is possible to expect further improvement in heat recovery efficiency by further increasing the number of the time of folding-back of the path of the exhaust gas 50 in the outer circumferential portion 15 of the honeycomb body 11.

In the exhaust heat recovery device of the present embodiment, although not illustrated, the "exhaust branch portion 30" and the "exhaust distribution portion 40" in FIG. 15 may be positioned on the upstream side of the honeycomb body 11. In addition, in FIG. 15, the honeycomb body 11 has a donut shape in which a central portion 14 thereof is hollow. However, like the honeycomb body 11b illustrated in FIG. 12, both the central portion 14b and the outer circumferential portion 15b may have a honeycomb structure. In each embodiments described below, the shape of the honeycomb body is not limited to the shapes illustrated in the drawings to be referred to, and the present invention can be applied to both a case where a central portion has a hollow donut shape and a case where both a central portion and an outer circumferential portion have a honeycomb structure.

In the exhaust heat recovery device of the present embodiment, although not illustrated, the path of the exhaust gas in the outer circumferential portion of the honeycomb body may be partitioned into three or more portions in the axial direction of the honeycomb body. With such a configuration, the path of the exhaust gas in the outer circumferential portion of the honeycomb body can be made three times longer than the axial length of the honeycomb body. For example, the "exhaust branch portion 30" in FIG. 15 is arranged on the upstream side of the honeycomb body 11, and after the outer circumferential portion 15 of the honeycomb body 11 is folded back twice, the exhaust gas 50 having passed through the outer circumferential portion 15 is discharged.

Figure 16:
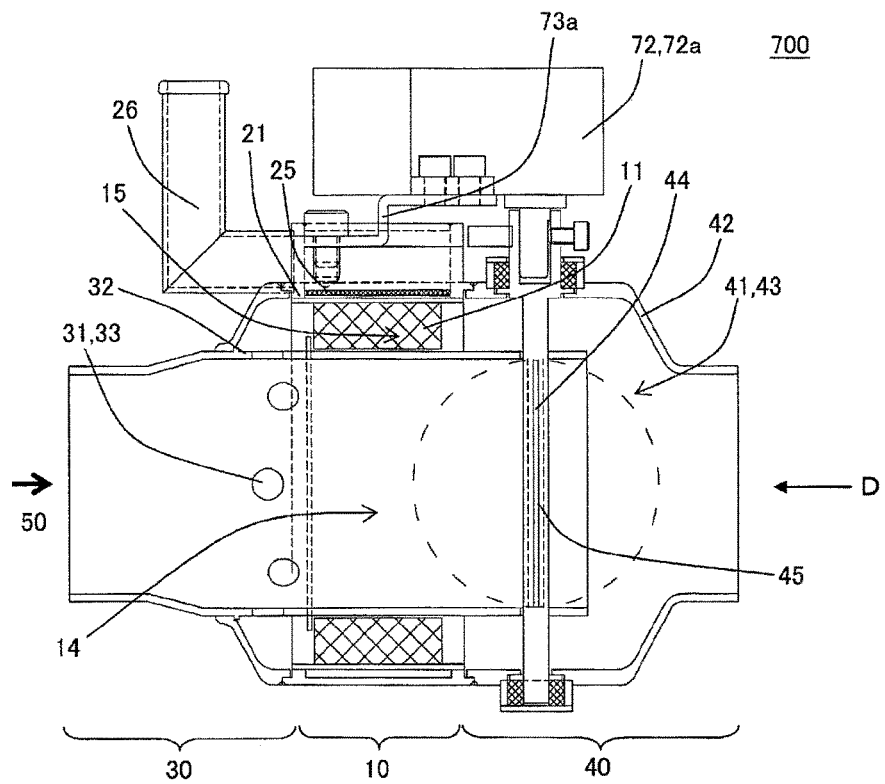
FIG. 16 is a cross-sectional view schematically illustrating a seventh embodiment of an exhaust heat recovery device of the present invention and is a cross-sectional view illustrating a cross-section parallel to a flow direction of an exhaust system.
Figure 17:
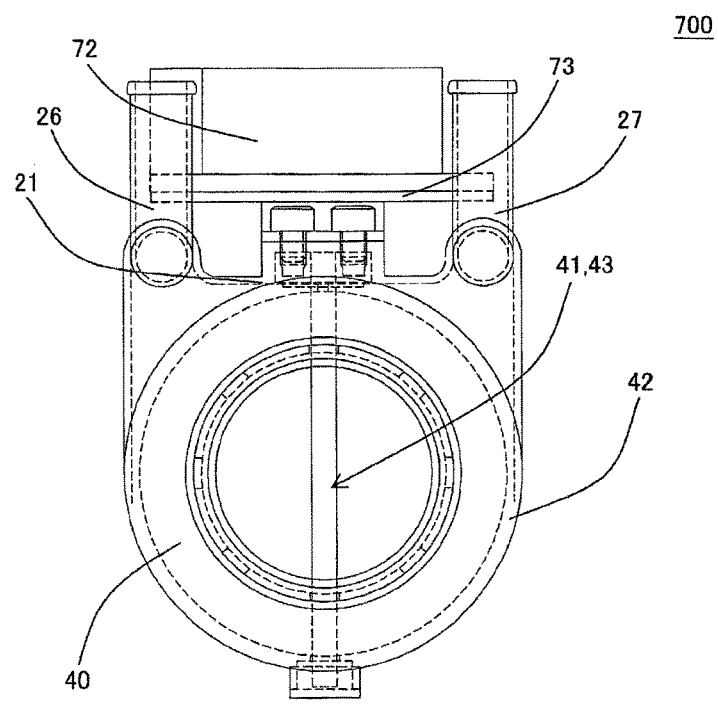
FIG. 17 is a plane view schematically illustrating the seventh embodiment of the exhaust heat recovery device of the present invention, and is a plane view of the exhaust heat recovery device illustrated in FIG. 16 when viewed in a direction of an arrow D.

(1-7) Seventh Embodiment of Exhaust Heat Recovery Device:

A seventh embodiment of an exhaust heat recovery device is an exhaust heat recovery device 700 illustrated in FIGS. 16 and 17. FIG. 16 is a cross-sectional view schematically illustrating a seventh embodiment of an exhaust heat recovery device of the present invention and is a cross-sectional view illustrating a cross-section parallel to a flow direction of an exhaust system. FIG. 17 is a plane view schematically illustrating the seventh embodiment of the exhaust heat recovery device of the present invention, and is a plane view of the exhaust heat recovery device illustrated in FIG. 16 when viewed in a direction of an arrow D. In the exhaust heat recovery device 700 illustrated in FIGS. 16 and 17, those constituted in the same manner as those of the exhaust heat recovery device 100 illustrated in FIGS. 1 to 3 are denoted by the same reference numerals and the description thereof may be omitted.

The exhaust heat recovery device 700 includes a heat exchange portion 10, an exhaust branch portion 30, and an exhaust distribution portion 40. The exhaust heat recovery device 700 further includes an external member 72 including a device accompanying heat generation. The external member 72 is a so-called externally attached member provided around a casing 21, and particularly, is a member that is intended to suppress an excessive temperature increase in the exhaust heat recovery device 700. Examples of the device accompanying heat generation, which is included in the external member 72, can include a motor 72a that is a power source of an on-off valve 43 constituting an exhaust distribution mechanism 41. In addition, an electronic device accompanying this, various other electronic devices, and the like are also the device accompanying heat generation. For example, since the motor 72a is provided around the casing 21, a temperature may increase due to heat transfer from the exhaust gas 50 through the casing 21 and the on-off valve 43.

In the exhaust heat recovery device 700, the heat transferred to the motor 72a and the like as described above is further recovered by the heat exchange medium. Furthermore, since the motor 72a and the like are accompanied by heat generation during the operation thereof, such heat generation can be further recovered by the heat exchange medium. With such a configuration, the temperature increase in the external member 72 of which the temperature increase is intended to be suppressed can be suppressed, and breakage of the external member 72 can be effectively prevented. In addition, the heat recovery efficiency of the heat exchange medium can be improved by recovering the heat from the external member 72.

In the exhaust heat recovery device 700, the motor 72a of the external member 72 is supported by a motor stay 73a and fixed to the vicinity of the casing 21. Therefore, the heat recovery from the external member 72 is performed through the motor stay 73a. Preferably, the motor stay 73a is arranged close to the path 25 of the heat exchange medium. The target of the heat recovery in the external member 72 is not limited to the above-described motor 72a. In addition, the method of recovering the heat in the external member 72 is not limited to the above-described motor stay 73a. Furthermore, although not illustrated, it is configured to further include another external member not including the device accompanying heat generation, and the heat transfer from the exhaust gas to the other external member may be further configured to be recovered by the heat exchange medium. There is no particular limitation on the other external member, and it is preferable to be an external member intended to suppress the temperature increase.

Figure 18:
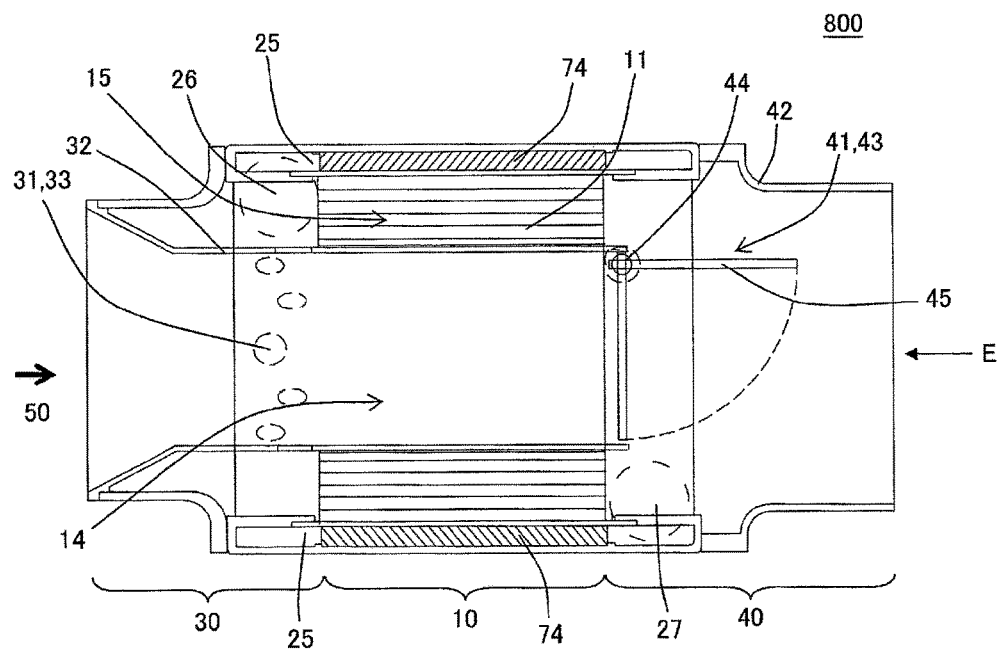
FIG. 18 is a cross-sectional view schematically illustrating an eighth embodiment of an exhaust heat recovery device of the present invention and is a cross-sectional view illustrating a cross-section parallel to a flow direction of an exhaust system.
Figure 19:
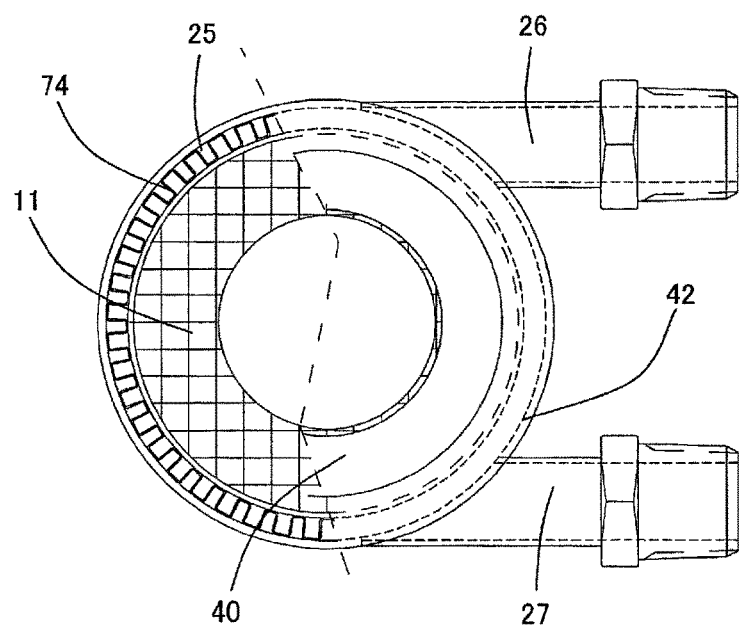
FIG. 19 is a plane view schematically illustrating the eighth embodiment of the exhaust heat recovery device of the present invention, and is a plane view of the exhaust heat recovery device illustrated in FIG. 18 when viewed in a direction of an arrow E.

(1-8) Eighth Embodiment of Exhaust Heat Recovery Device:

An eighth embodiment of an exhaust heat recovery device is an exhaust heat recovery device 800 illustrated in FIGS. 18 and 19. FIG. 18 is a cross-sectional view schematically illustrating an eighth embodiment of an exhaust heat recovery device of the present invention and is a cross-sectional view illustrating a cross-section parallel to a flow direction of an exhaust system. FIG. 19 is a plane view schematically illustrating the eighth embodiment of the exhaust heat recovery device of the present invention, and is a plane view of the exhaust heat recovery device illustrated in FIG. 18 when viewed in a direction of an arrow E. In the exhaust heat recovery device 800 illustrated in FIGS. 18 and 19, those constituted in the same manner as those of the exhaust heat recovery device 100 illustrated in FIGS. 1 to 3 are denoted by the same reference numerals and the description thereof may be omitted.

The exhaust heat recovery device 800 includes a heat exchange portion 10, an exhaust branch portion 30, and an exhaust distribution portion 40. In the exhaust heat recovery device 800, a heat exchange auxiliary member 74 is arranged in a path 25 of a heat exchange medium. The heat exchange auxiliary member 74 is connected to a cylindrical member arranged so as to be fitted to an outer circumferential surface of a honeycomb body 11 and is heated by heat transfer from the cylindrical member. Due to the heat exchange auxiliary member 74, the heat recovery efficiency of the heat exchange medium can be improved.

The heat exchange auxiliary member 74 is preferably shaped to increase the surface area of the heat transfer portion, for example, in the path 25 of the heat exchange medium. Examples of the heat exchange auxiliary member 74 can include one having a shape of a bellows type fold. Examples of the member having such a shape can include a corrugated pipe or the like. In addition, a plurality of fins provided so as to protrude in a normal direction or the like from the surface of the cylindrical member may be used as the heat exchange auxiliary member 74.

There is no particular limitation on the material of the heat exchange auxiliary member 74, but it is preferable that the material has high thermal conductivity. Examples of the material of the heat exchange auxiliary member 74 can include copper or the like.

(1-9) Further Another Embodiment of Exhaust Heat Recovery Device:

Hereinafter, further another embodiment of an exhaust heat recovery device will be described with reference to FIGS. 20 to 27. FIGS. 20 to 26 are cross-sectional views schematically illustrating further another embodiment of an exhaust heat recovery device of the present invention and are cross-sectional views illustrating a cross-section parallel to a flow direction of an exhaust system. FIG. 27 is a perspective view schematically illustrating a honeycomb body used in further another embodiment of the exhaust heat recovery device of the present invention. In each exhaust heat recovery device illustrated in FIGS. 20 to 27, those constituted in the same manner as those of the exhaust heat recovery device 100 illustrated in FIGS. 1 to 3 are denoted by the same reference numerals and the description thereof may be omitted.

Figure 20:
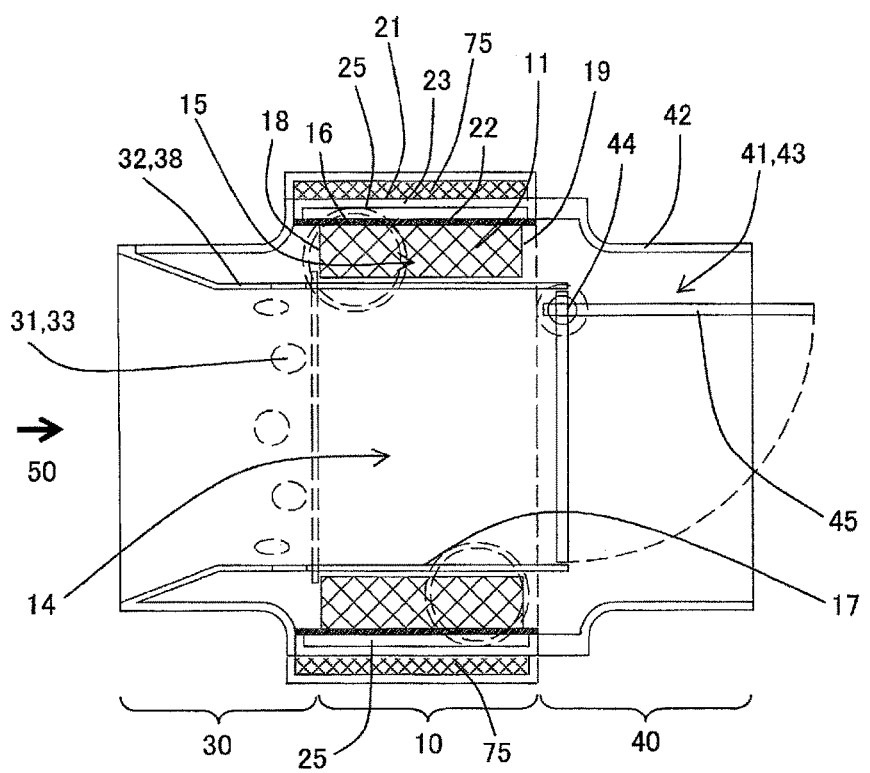
FIG. 20 is a cross-sectional view schematically illustrating further another embodiment of an exhaust heat recovery device of the present invention and is a cross-sectional view illustrating a cross-section parallel to a flow direction of an exhaust system.

The exhaust heat recovery device 900 illustrated in FIG. 20 includes a heat exchange portion 10, an exhaust branch portion 30, and an exhaust distribution portion 40. In the exhaust heat recovery device 900, a heat insulating layer 75 is provided outside a path 25 of a heat exchange medium. The exhaust heat recovery device 900 is provided in an exhaust system of an automobile or the like and used for recovering exhaust heat. Usually, the exhaust system of the automobile is often exposed to outside air on the belly side of the automobile. Therefore, in a case where the exhaust heat recovery device 900 is provided in the exhaust system of the automobile or the like, exhaust heat collected once by the heat exchange medium may be dissipated to the outside air. In the exhaust heat recovery device 900, since the heat insulating layer 75 is provided outside the path 25 of the heat exchange medium, it is possible to effectively suppress the dissipation of heat from the heat exchange medium.

As the heat insulating layer 75, for example, a casing may be further provided outside the path 25 of the heat exchange medium to form an air layer inside the casing. Due to the provision of such an air layer, the dissipation of heat from the heat exchange medium can be extremely easily suppressed.

In addition, the heat insulating layer 75 may be other than the air layer described above. For example, a material with low thermal conductivity may be arranged outside the path 25 of the heat exchange medium, and the material with low thermal conductivity may be used as the heat insulating layer 75. In addition, a heat storage material or the like may be used as the heat insulating layer 75, and there is no particular limitation as long as it can suppress dissipation of heat from the heat exchange medium.

Figure 21:
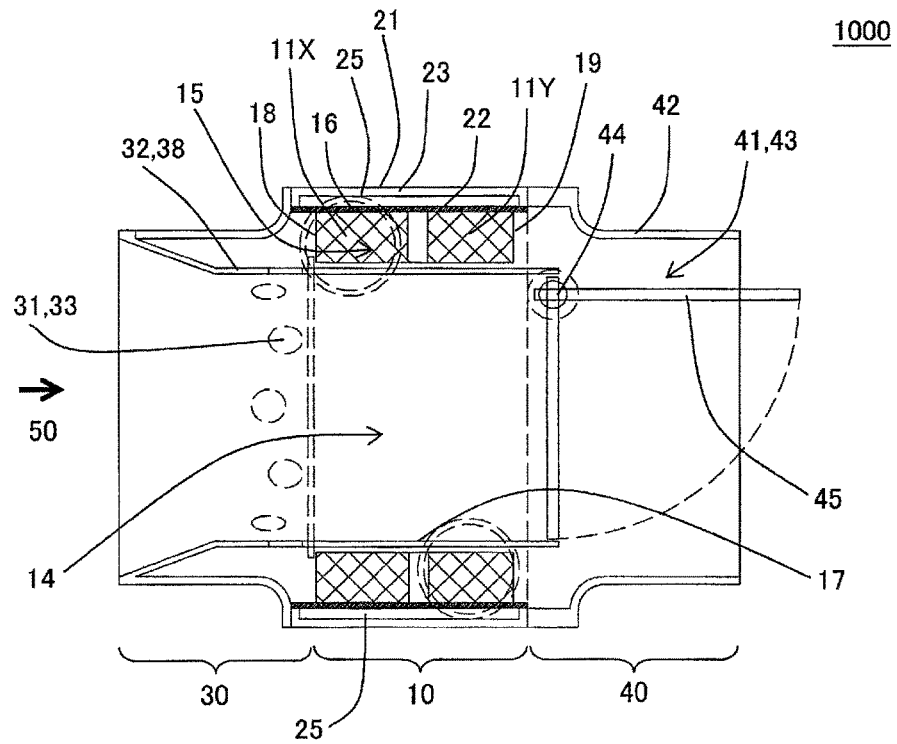
FIG. 21 is a cross-sectional view schematically illustrating further another embodiment of an exhaust heat recovery device of the present invention and is a cross-sectional view illustrating a cross-section parallel to a flow direction of an exhaust system.

The exhaust heat recovery device 1000 illustrated in FIG. 21 includes a heat exchange portion 10, an exhaust branch portion 30, and an exhaust distribution portion 40. In the exhaust heat recovery device 1000, two honeycomb bodies 11X and 11Y are arranged in series in the flow direction of the exhaust gas 50. The two honeycomb bodies 11X and 11Y are arranged in series in a state in which a gap is provided in the flow direction of the exhaust gas 50. Therefore, between the end faces forming the gap between the honeycomb bodies 11X and 11Y, the exhaust gas 50 discharged from the honeycomb body 11X arranged on the upstream side is agitating before being introduced into the honeycomb body 11Y arranged on the downstream side. Therefore, the recovery efficiency of the exhaust heat can be increased. In addition, the exhaust gas 50 discharged from the honeycomb body 11X collides with the end face on the inflow side of the honeycomb body 11Y, thereby further promoting the agitation of the exhaust gas 50.

In the exhaust heat recovery device 1000, two honeycomb bodies 11X and 11Y are arranged in series in the flow direction of the exhaust gas 50, but three or more honeycomb bodies may be provided. For example, a technique disclosed in WO 2012/169622 can be employed as a technique in which a plurality of honeycomb bodies are arranged in series in the flow direction of the exhaust gas 50 and heat from the exhaust gas is recovered by the plurality of honeycomb bodies.

Figure 22:
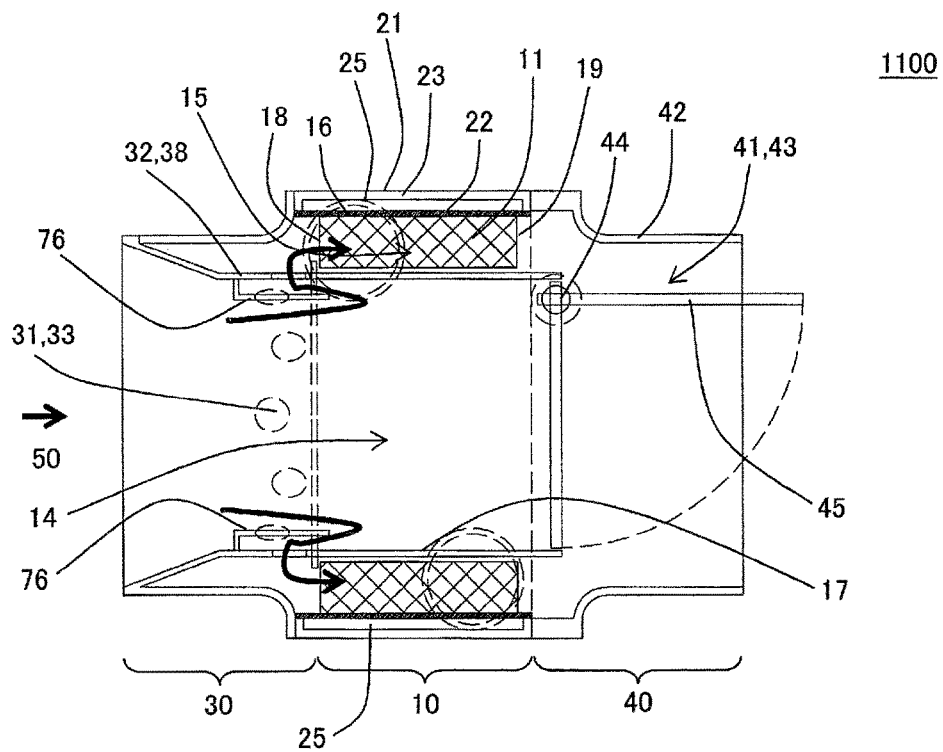
FIG. 22 is a cross-sectional view schematically illustrating further another embodiment of an exhaust heat recovery device of the present invention and is a cross-sectional view illustrating a cross-section parallel to a flow direction of an exhaust system.

The exhaust heat recovery device 1100 illustrated in FIG. 22 includes a heat exchange portion 10, an exhaust branch portion 30, and an exhaust distribution portion 40. In the exhaust heat recovery device 1100, a rectification portion 76 is provided at a position at which a through-hole 33 of a pipe 32 constituting an exhaust branch portion 30 is formed. The rectification portion 76 is formed by arranging a short pipe having a small inner diameter inside the portion of the pipe 32 at which the through-hole 33 is formed. Between the pipe 32 and the short pipe, the upstream side is closed and the downstream side is opened. Therefore, in order for the exhaust gas 50 to pass through the through-hole 33 of the pipe 32, it is necessary to reach the through-hole 33 by the flow after passing through the short pipe of the rectification portion 76. With such a configuration, a flow velocity of the exhaust gas 50 passing through the through-hole 33 is uniform in the entire circumferential direction of the pipe 32, and imbalance of the exhaust gas 50 flowing into the outer circumferential portion 15 of the honeycomb body 11 can be suppressed.

Figure 23:
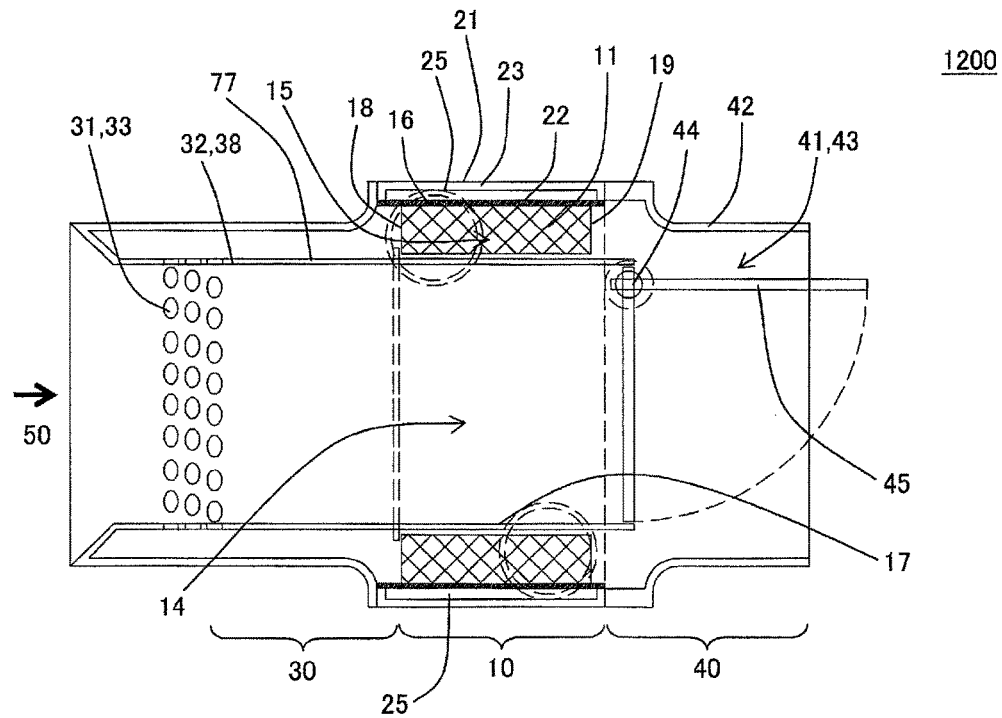
FIG. 23 is a cross-sectional view schematically illustrating further another embodiment of an exhaust heat recovery device of the present invention and is a cross-sectional view illustrating a cross-section parallel to a flow direction of an exhaust system.

The exhaust heat recovery device 1200 illustrated in FIG. 23 includes a heat exchange portion 10, an exhaust branch portion 30, and an exhaust distribution portion 40. In the exhaust heat recovery device 1200, exhaust gas 50 flowing into an outer circumferential portion 15 of a honeycomb body 11 is rectified by increasing a distance from a through-hole 33 of a pipe 32 constituting an exhaust branch portion 30 to the honeycomb body 11. That is, in the exhaust heat recovery device 1200, a rectification portion 77 is provided between the through-hole 33 of the pipe 32 constituting the exhaust branch portion 30 and the first end face 18 of the outer circumferential portion 15 of the honeycomb body 11. The rectification portion 77 can be formed by extending the downstream side of the pipe 32. With such a configuration, the flow of the exhaust gas 50 flowing in from a plurality of through-holes 33 is uniform by passing through the rectification portion 77, and the imbalance of the exhaust gas 50 flowing into the outer circumferential portion 15 of the honeycomb body 11 can be suppressed. The length and the like of the rectification portion 77 are not particularly limited, and it is preferable that the length thereof is sufficiently long to eliminate the imbalance of the exhaust gas 50 flowing into the outer circumferential portion 15 of the honeycomb body 11.

Figure 24:
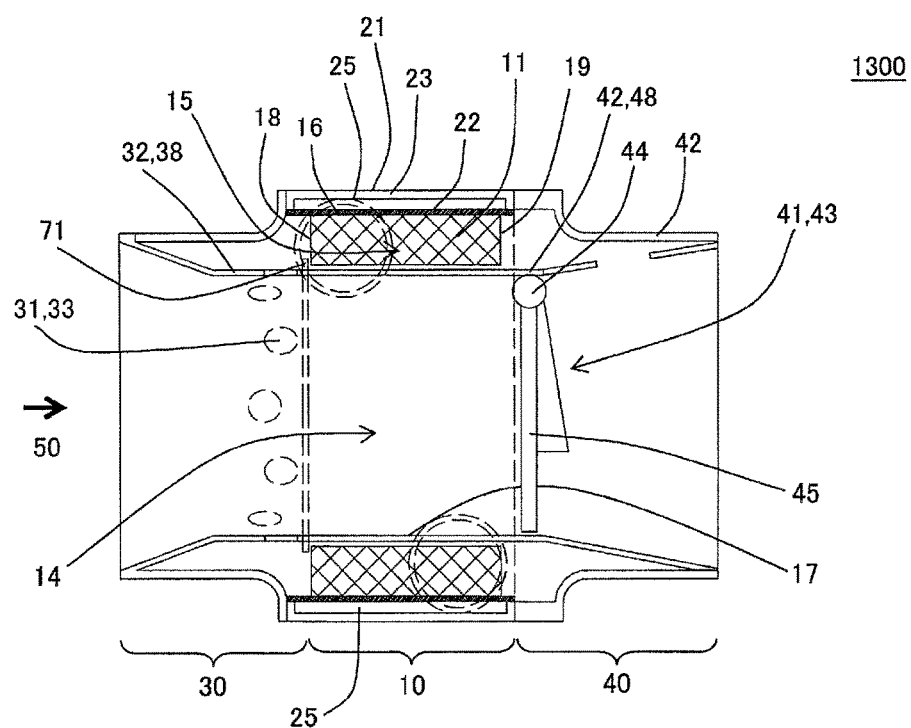
FIG. 24 is a cross-sectional view schematically illustrating further another embodiment of an exhaust heat recovery device of the present invention and is a cross-sectional view illustrating a cross-section parallel to a flow direction of an exhaust system.
Figure 25:
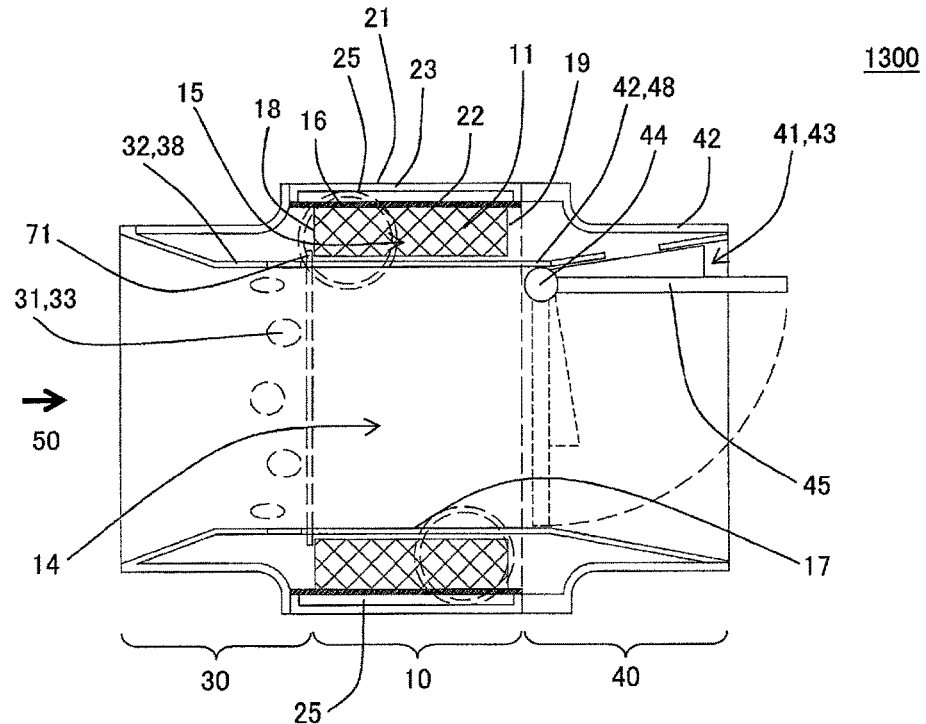
FIG. 25 is a cross-sectional view schematically illustrating further another embodiment of an exhaust heat recovery device of the present invention and is a cross-sectional view illustrating a cross-section parallel to a flow direction of an exhaust system.

The exhaust heat recovery device 1300 illustrated in FIGS. 24 and 25 includes a heat exchange portion 10, an exhaust branch portion 30, and an exhaust distribution portion 40. The exhaust heat recovery device 1300 is characterized in terms of a shape of an on-off valve 43 of an exhaust distribution mechanism 41. As illustrated in FIG. 24, when the on-off valve 43 is closed, the airflow resistance of the central portion 14 of the honeycomb body 11 increases, and the amount of the exhaust gas flowing to the outer circumferential portion 15 of the honeycomb body 11 increases. At this time, the exhaust gas 50 having passed through the outer circumferential portion 15 of the honeycomb body 11 is discharged to the downstream side without being limited by the on-off valve 43. In the exhaust heat recovery device 1300, as illustrated in FIG. 25, when the on-off valve 43 is opened (that is, when the on-off valve 43 of the central portion 14 is opened), the airflow resistance in the central portion 14 of the honeycomb body 11 decreases, and the exhaust gas 50 preferentially flows through the central portion 14. In the exhaust heat recovery devices of the first embodiment and the like, which has been described so far, when the on-off valve 43 of the central portion 14 is opened, the exhaust amount passing through the outer circumferential portion 15 of the honeycomb body 11 decreases, but the flow of the exhaust gas 50 in the outer circumferential portion 15 of the honeycomb body 11 is not completely stopped. In the exhaust heat recovery device 1300, when the on-off valve 43 of the central portion 14 is opened, the valve body 45 of the on-off valve 43 closes the path of the exhaust gas 50 at the outer circumferential portion 15. Therefore, in the exhaust heat recovery device 1300, the exhaust gas 50 can be caused to flow only to either the central portion 14 or the outer circumferential portion 15 by opening and closing the on-off valve 43.

It is preferable that the on-off valve 43 of the exhaust distribution mechanism 41 in the exhaust heat recovery device 1300 closes the path of the exhaust gas 50 of either the central portion 14 or the outer circumferential portion 15 at the time of opening and closing the on-off valve 43. That is, it is preferable that the number of the valve body 45 of the on-off valve 43 is one. With such a configuration, it is possible to prevent the paths of both the central portion 14 and the outer circumferential portion 15 from being closed when the failure or the like of the on-off valve 43 occurs. For example, in the case of using the on-off valve 43 such that both paths of the central portion 14 and the outer circumferential portion 15 are closed when the on-off valve 43 fails, the flow of the exhaust system is completely stopped when the on-off valve 43 fails, which may adversely affect the internal combustion engine.

Figure 26:
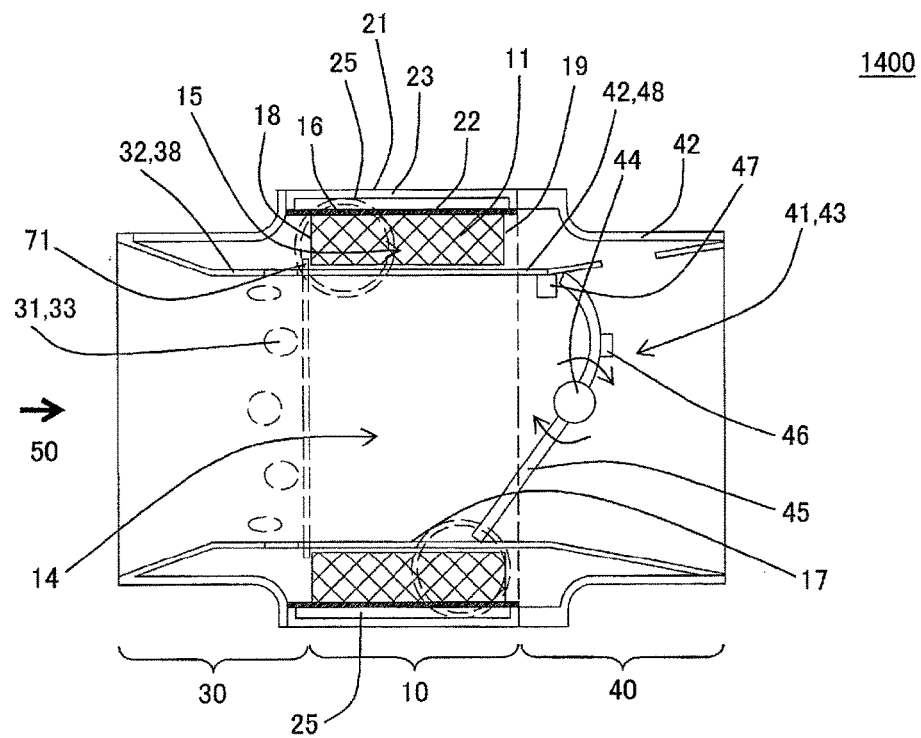
FIG. 26 is a cross-sectional view schematically illustrating further another embodiment of an exhaust heat recovery device of the present invention and is a cross-sectional view illustrating a cross-section parallel to a flow direction of an exhaust system.
Figure 27:
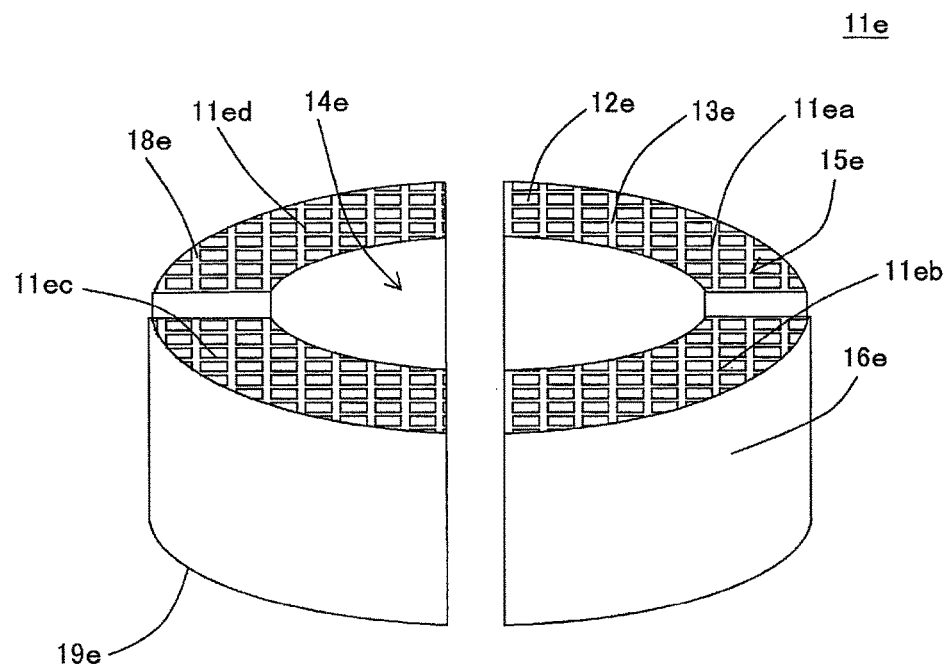
FIG. 27 is a perspective view schematically illustrating a honeycomb body used in further another embodiment of the exhaust heat recovery device of the present invention.

The exhaust heat recovery device 1400 illustrated in FIG. 26 includes a heat exchange portion 10, an exhaust branch portion 30, and an exhaust distribution portion 40. The exhaust heat recovery device 1400 is characterized in terms of a shape of an on-off valve 43 of an exhaust distribution mechanism 41. As illustrated in FIG. 26, the surface of the valve body 45 of the on-off valve 43 is curved with respect to a plane orthogonal to the flow direction of the exhaust gas 50. Therefore, when the exhaust gas 50 flowing through the central portion 14 of the honeycomb body 11 collides with the surface of the valve body 45, the valve body 45 of the on-off valve 43 easily rotates around the valve rod 44 as the axis. Further, the valve body 45 of the on-off valve 43 is provided with a weight 46 only on one side of the valve body 45 with the valve rod 44 interposed therebetween, and the failure or the like of the on-off valve 43 occurs. Even when no driving force is applied to the valve body 45, the path of the central portion 14 is hardly closed by the above-described weight 46. That is, the on-off valve 43 of the central portion 14 is easily opened. Therefore, even in a situation in which the on-off valve 43 fails, no load is likely to occur in the internal combustion engine, the exhaust system, and the exhaust heat recovery device 1400, and the exhaust heat recovery device 1400 can be used more safely.

The shape of the on-off valve 43 of the exhaust distribution mechanism 41 is not limited to the shape illustrated in FIG. 26, and any structure may be used as long as the on-off valve 43 is easily opened by the gas pressure of the exhaust gas 50. In addition, in the exhaust heat recovery device 1400 illustrated in FIG. 26, a reverse rotation prevention member 47 for preventing the reverse rotation of the on-off valve 43 is provided above the on-off valve 43. The reverse rotation prevention member 47 is constituted by a protrusion protruding into the path of the exhaust gas 50 and collides with the end portion of the on-off valve 43 when the on-off valve 43 rotates in the reverse direction, such that the reverse rotation of the on-off valve 43 is prevented.

A honeycomb body 11e illustrated in FIG. 27 is constituted by four honeycomb bodies 11ea, 11eb, 11ec, and 11ed, of which a cross-sectional shape in a cross-section orthogonal to an extending direction of cells 12e is a quadrant in which a circle is approximately equally divided into four parts. That is, the aggregate of the four honeycomb bodies 11ea, 11eb, 11ec, and 11ed is a honeycomb body 11e. The honeycomb body 11e has a first end face 18e and a second end face 19e, and has a honeycomb structure in which a plurality of cells 12e are defined and formed by partition walls 13e. In the honeycomb body 11e, the central portion 14e has a hollow donut shape. The outer circumferential portion 15e of the honeycomb body 11e is constituted by the above-described four honeycomb bodies 11ea, 11eb, 11ec, and 11ed. As described above, the honeycomb body used for the exhaust heat recovery device of the present invention is not limited to one having a circular cross-sectional shape or a donut shape with a hollow center, and the honeycomb body may be divided into two or more portions in the radial direction. Although not illustrated, in a case where the honeycomb body is divided in the radial direction, both the central portion and the outer circumferential portion may have a honeycomb structure in which the plurality of cells are defined and formed by the partition walls. That is, it is not limited to the donut shape such as the honeycomb body 11e illustrated in FIG. 27.

EXAMPLES

Hereinafter, the present invention will be described more specifically with reference to examples, but the present invention is not limited to these examples.

Example 1

As an exhaust heat recovery device of Example 1, an exhaust heat recovery device configured in the same manner as the exhaust heat recovery device 200 illustrated in FIG. 5 was manufactured. Hereinafter, a method of manufacturing the exhaust heat recovery device of Example 1 will be described.

(Production of Honeycomb Body)

A kneaded clay containing a SiC powder was extruded into a desired shape, dried, processed into a predetermined external size, and then impregnated with Si and baked to produce a round pillar-shaped honeycomb fired body. The honeycomb fired body had a diameter (outer diameter) of an end face of 70 mm and a length of 35 mm in an extending direction of cells. A cell density of the honeycomb fired body was 23 cells/cm$^2$, and a thickness (wall thickness) of a partition wall was 0.3 mm. A thermal conductivity of the honeycomb fired body was 150 W/(m·K).

Next, a range of 52 mm in a diameter including the center of the end face of the produced honeycomb fired body was hollowed out into a round pillar-shaped, and a donut-shaped honeycomb body having a hollow central portion was produced. A cylindrical inner wall made of stainless steel and having a size corresponding to an inner diameter of the hollow was arranged inside the hollow of the produced honeycomb body.

(Production of Heat Exchange Portion)

Next, a cylindrical member made of stainless steel was produced. The cylindrical member had a cylindrical shape with an inner diameter of 69.8 mm and an axial length of 41.5 mm, and an wall thickness thereof was 1 mm. Next, the honeycomb body was inserted into the produced cylindrical member of the inner cylinder, and the cylindrical member was arranged so as to be fitted to the outer circumferential surface of the honeycomb body by shrinkage fitting.

Next, a casing body made of stainless steel was produced. The casing body had a cylindrical shape with an inner diameter of 76 mm and an axial length of 41.5 mm, and an wall thickness thereof was 1.5 mm. In the casing body, a heat exchange medium introduction port into which a heat exchange medium was introduced and a heat exchange medium discharge port from which the heat exchange medium was discharged were formed.

Next, the cylindrical member in which the honeycomb body is fixed by fitting was arranged inside the produced casing body, the casing body and the cylindrical member were joined by welding, and a heat exchange portion including the honeycomb body and the casing was produced. The path of the heat exchange medium having a distance of 2.0 mm between the casing body and the cylindrical member was formed in the radial direction of the honeycomb body between the casing body and the cylindrical member.

(Production of Exhaust Branch Portion)

An exhaust branch portion configured in the same manner as the exhaust branch portion 30a of the exhaust heat recovery device 200 illustrated in FIG. 5 was produced. Specifically, the exhaust branch portion having a double pipe structure was produced by using a first pipe made of stainless steel and a second pipe made of stainless steel. The first pipe was a cylindrical pipe having an axial length of 31.5 mm, an outer diameter of 54 mm, and a wall thickness of 1.5 mm. Ten through-holes having substantially circular shapes were formed on the downstream side of the first pipe, and the through-hole was used as a branch path of the exhaust branch portion. The second pipe used a pipe having a spreading portion in which a length in an axial direction was 15.5 mm, an inner diameter of one end portion on the upstream side was 51 mm, and an inner diameter of the other end portion on the downstream side was 72 mm. The first pipe was arranged inside the second pipe, and the second pipe and the first pipe were joined by welding to produce an exhaust branch portion having a branch path. When arranging and joining the first pipe inside the second pipe, the position of the end face of the first pipe on the downstream side and the position of the end face of the second pipe on the downstream side are arranged so as to coincide with each other, and both were joined.

(Production of Exhaust Distribution Portion)

An exhaust distribution portion configured in the same manner as the exhaust distribution portion 40a of the exhaust heat recovery device 200 illustrated in FIG. 5 was produced. Specifically, in a pipe made of stainless steel and having an outer diameter of 51 mm, an exhaust distribution mechanism 41a of the exhaust distribution portion 40a was mounted with an on-off valve 43a configured such that a valve body 45a rotates around a valve rod 44a arranged so as to traverse a pipe 42a, and an exhaust distribution portion was produced.

The heat exchange portion was connected to the produced exhaust branch portion, and further, the exhaust distribution portion was connected to the heat exchange portion on the downstream side to produce an exhaust heat recovery device of Example 1.

Example 2

As an exhaust heat recovery device of Example 2, an exhaust heat recovery device configured in the same manner as the exhaust heat recovery device 300 illustrated in FIG. 9 was manufactured. The exhaust heat recovery device of Example 2 was manufactured in the same manner as in Example 1, except that, in producing the heat exchange portion, the central portion of the honeycomb structure was not hollowed out and both the central portion and the outer circumferential portion used the honeycomb body having the honeycomb structure.

Comparative Example 1

Figure 28:
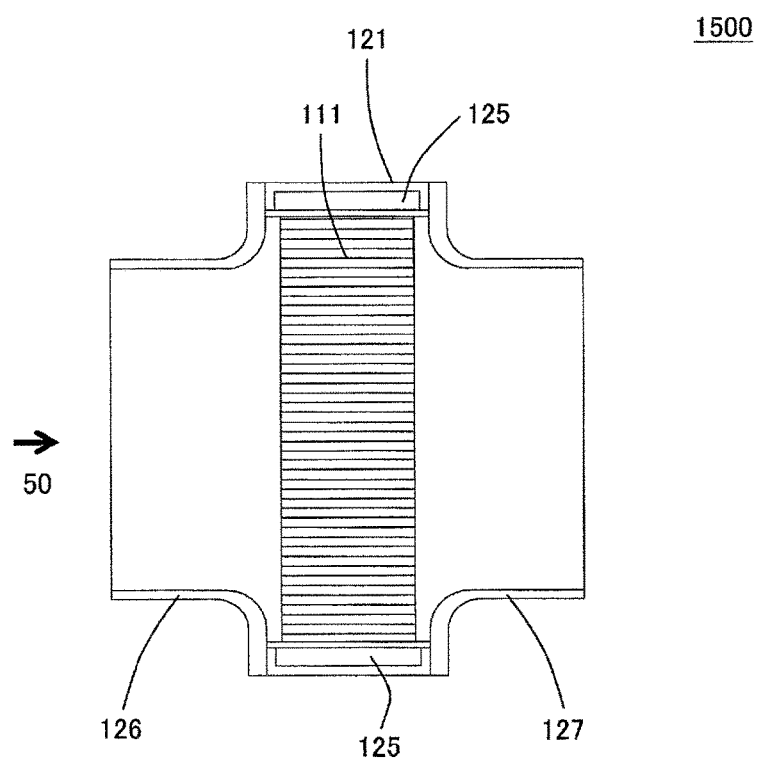
FIG. 28 is a cross-sectional view schematically illustrating an exhaust heat recovery device of Comparative Example 1 and is a cross-sectional view illustrating a cross-section parallel to a flow direction of an exhaust system.

As an exhaust heat recovery device of Comparative Example 1, an exhaust heat recovery device configured in the same manner as the exhaust heat recovery device 1500 illustrated in FIG. 28 was manufactured. FIG. 28 is a cross-sectional view schematically illustrating an exhaust heat recovery device of Comparative Example 1 and is a cross-sectional view illustrating a cross-section parallel to a flow direction of an exhaust system. As illustrated in FIG. 28, in the exhaust heat recovery device 1500 of Comparative Example 1, a honeycomb body 111 is accommodated in a casing 121, and a path 125 of a heat exchange medium 51 is provided on an outer circumferential side of a place where the honeycomb body 111 of the casing 121 is arranged. In the exhaust heat recovery device of Comparative Example 1, the second pipe of the exhaust branch portion of Embodiment 1 was connected to both ends of the casing 121 and used as the exhaust gas introduction pipe 126 into which the exhaust gas was introduced and the exhaust gas discharge pipe 127 from which the exhaust gas was discharged. In addition, the same configuration as that of the heat exchange portion of Example 2 was used for the honeycomb body 111 and the casing 121.

(Measurement of Heat Recovery Efficiency)

The heat recovery efficiency was measured when exhaust gas (first fluid) passed through the exhaust heat recovery devices of Examples 1 and 2 and Comparative Example 1 and water (second fluid) was used as a heat exchange medium. The heat recovery efficiency was obtained by Equation (1) below by measuring the heat input amount flowing into the exhaust heat recovery device and the recovered heat amount recovered by the exhaust heat recovery device.

$$\text{Heat recovery efficiency} = \text{Recovered heat amount}/\text{Heat input amount} \times 100 \quad \text{Equation (1)}$$

The heat input amount can be obtained as the product of a "temperature difference between the first fluid and the second fluid before flowing into the exhaust heat recovery device", a "specific heat capacity of the first fluid", and a "mass flow rate of the first fluid". The "temperature difference between the first fluid and the second fluid before flowing into the exhaust heat recovery device" refers to a value obtained by subtracting the temperature of the second fluid immediately before flowing into the exhaust heat recovery device from the temperature of the first fluid immediately before flowing into the exhaust heat recovery device. In addition, the recovered heat amount can be obtained by the product of the "temperature difference of the second fluid before flowing into the exhaust heat recovery device and after flowing out from the exhaust heat recovery device", the "specific heat capacity of the second fluid", and the "mass flow rate of the second fluid". The "temperature difference of the second fluid before flowing into the exhaust heat recovery device and after flowing out from the exhaust heat recovery device" refers to a value obtained by subtracting the temperature of the second fluid immediately before flowing into the exhaust heat recovery device from the temperature of the second fluid immediately after flowing out from the exhaust heat recovery device.

The measurement of the heat recovery efficiency was performed under six conditions: the temperature of the exhaust gas was set to 400° C. and the flow rate of the exhaust gas was set to 5 g/s, 10 g/s, 20 g/s, 40 g/s, 60 g/s, and 100 g/s. In the exhaust heat recovery devices of Examples 1 and 2, the heat recovery was performed when the on-off valve used as the exhaust distribution mechanism of the exhaust distribution portion was "closed" under the three conditions of 5 g/s, 10 g/s, and 20 g/s. Then, in the exhaust heat recovery devices of Examples 1 and 2, the heat recovery was performed when the on-off valve used as the exhaust distribution mechanism of the exhaust distribution portion was "opened" under the three conditions of 40 g/s, 60 g/s, and 100 g/s. The measurement results of the heat recovery efficiency are shown in Table 1.

TABLE 1

| Flow Rate of Exhaust Gas | Heat Recovery Efficiency | | |
|---|---|---|---|
| | Example 1 | Example 2 | Comparative Example 1 |
| 5 g/s | 75% | 75% | 77% |
| 10 g/s | 60% | 62% | 62% |
| 20 g/s | 40% | 45% | 41% |
| 40 g/s | 3% (on-off valve "open") | 4% (on-off valve "open") | 25% |
| 60 g/s | 2% (on-off valve "open") | 2% (on-off valve "open") | 20% |
| 100 g/s | 2% (on-off valve "open") | 2% (on-off valve "open") | 17% |

(Result)

Compared with the exhaust heat recovery device of Comparative Example 1, the exhaust heat recovery devices of Examples 1 and 2 could adjust the heat recovery efficiency according to the flow rate of exhaust gas and perform appropriate exhaust heat recovery.

Example 3

Figure 29:
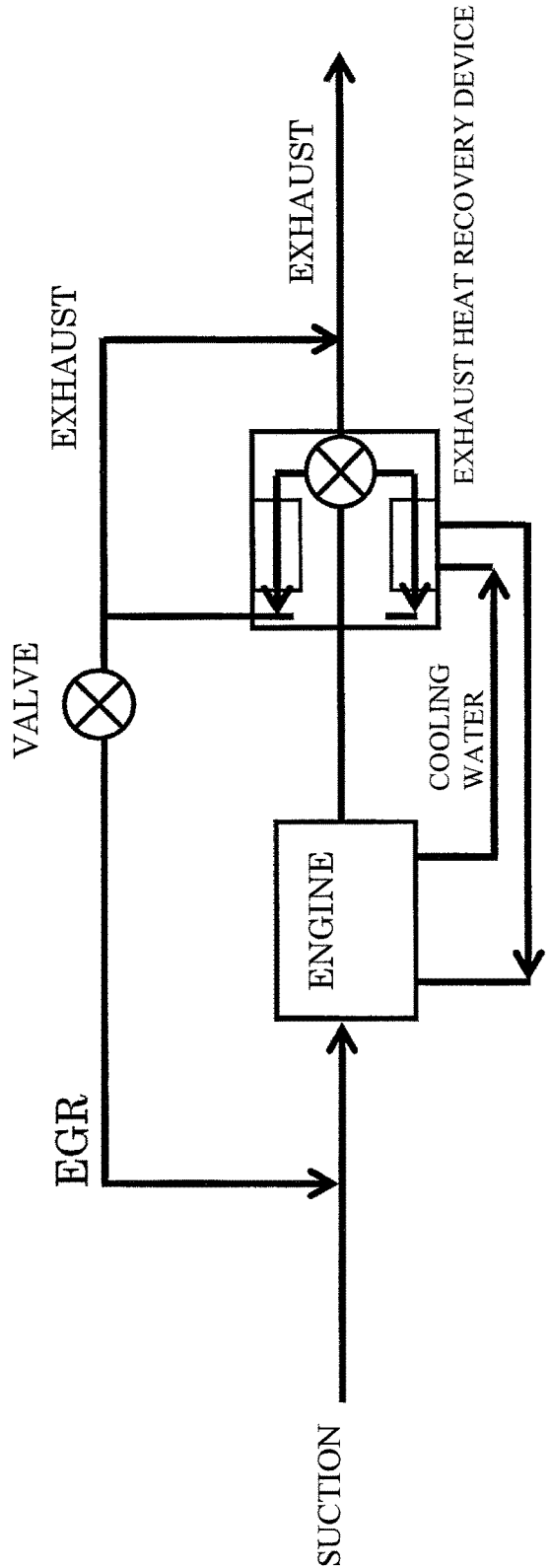
FIG. 29 is a schematic view illustrating a configuration of an exhaust heat recovery device of Example 3.

As an exhaust heat recovery device of Example 3, an exhaust heat recovery device as illustrated in FIG. 29 was produced. FIG. 29 is a schematic view illustrating the configuration of the exhaust heat recovery device of Example 3. As illustrated in FIG. 13, the same configuration as that of the exhaust heat recovery device 400 was used as the exhaust heat recovery device of Example 3. The exhaust heat recovery device of Example 3 could be suitably used as an EGR (exhaust gas recirculation) cooler. In particular, as illustrated in FIG. 13, the exhaust gas 50X and the exhaust gas 50Y were configured to be discharged from the discharge ports 60 and 61 of the different paths, respectively, so that the exhaust heat recovery was possible even when the EGR was not operated.

Comparative Example 2

Figure 30:
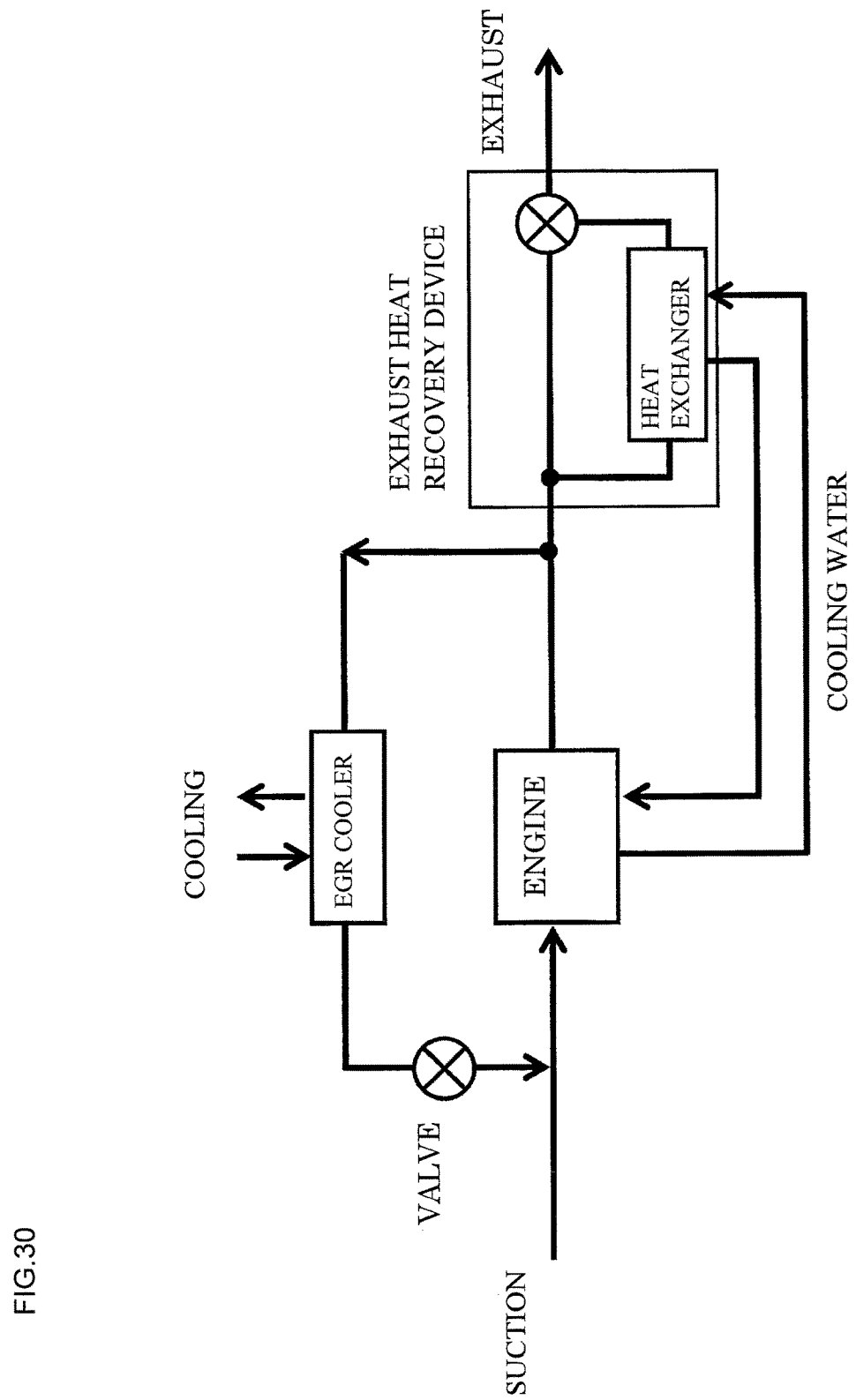
FIG. 30 is a schematic view illustrating a configuration of an exhaust heat recovery device of Comparative Example 2.

As an exhaust heat recovery device of Comparative Example 2, an exhaust heat recovery device as illustrated in FIG. 30 was produced. FIG. 30 is a schematic view illustrating the configuration of the exhaust heat recovery device of Comparative Example 2. In the exhaust heat recovery device of Comparative Example 2, an EGR (exhaust gas recirculation) cooler and a heat exchanger are individually connected to an engine. In the exhaust heat recovery device of Comparative Example 2, an amount of exhaust gas on the heat exchanger side was reduced at the time of EGR (exhaust gas recirculation), and an amount of heat recovered by the heat exchanger was reduced. On the other hand, in the exhaust heat recovery device of Example 3, since the cooled gas after the exhaust heat recovery could be turned to EGR (exhaust gas recirculation), an excellent effect that there is no reduction in the amount of exhaust heat recovery was obtained.

INDUSTRIAL APPLICABILITY

The exhaust heat recovery device of the present invention is installed in an exhaust path of an internal combustion engine and can be used for recovering exhaust heat of exhaust gas passing through the exhaust path.

DESCRIPTION OF REFERENCE NUMERALS 10, 10b, 10c, and 10d: heat exchange portion, 11, 11b, 11c, 11d, 11e, 11ea, 11eb, 11ec, 11ed, 11X, and 11Y: honeycomb body, 12, 12b, and 12e: cell, 13, 13b, and 13e: partition wall, 14, 14b, 14c, 14d, and 14e: central portion, 15, 15b, 15c, 15d, and 15e: outer circumferential portion, 16, 16b, and 16e: outer circumferential surface, 17: inner wall structure, 18, 18b, 18c, 18d and 18e: first end face, 19, 19b, 19c, 19d, and 19e: second end face, 21, 21b, 21c and 21d: casing, 22 and 22b: cylindrical member, 23 and 23b: casing body, 25 and 25b: path (path of heat exchange medium), 26 and 26b: heat exchange medium introduction port, 27 and 27b: heat exchange medium discharge port, 30, 30a, 30b, 30c, and 30d: exhaust branch portion, 31, 31b, 31c, and 31d: branch path, 32, 32a, 32b, 32c, and 32d: pipe, 33 and 33b: through-hole, 38 and 48: exhaust guide member, 40, 40a, 40b, and 40c: exhaust distribution portion, 41, 41a, 41b, and 41c: exhaust distribution mechanism, 42, 42a, and 42b: pipe, 43, 43a, and 43b: on-off valve, 44, 44a, and 44b: valve rod, 45, 45a, and 45b: valve body, 46: weight, 47: reverse rotation prevention member, 50: exhaust gas, 50X: exhaust gas (exhaust gas passing through outer circumferential portion of honeycomb body), 50Y: exhaust gas (exhaust gas passing through central portion of honeycomb body), 51: heat exchange medium, 60 and 61: discharge port, 71: ring-shaped member, 72: external member, 72a: motor, 73a: motor stay, 74: heat exchange auxiliary member, 75: heat insulating layer, 76 and 77: rectification portion, 100, 200, 300, 400, 500, 600, 700, 800, 900, 1000, 1100, 1200, 1300, 1400, and 1500: exhaust heat recovery device, 111: honeycomb body, 121: casing, 125: path (path of heat exchange medium), 126: exhaust gas introduction pipe, 127: exhaust gas discharge pipe.

The invention claimed is:

1. An exhaust heat recovery device comprising a heat exchange portion, an exhaust branch portion, and an exhaust distribution portion,
wherein the heat exchange portion comprises a pillar-shaped honeycomb body having a first end face, a second end face and a hollow central portion, and a casing accommodating the honeycomb body,
the honeycomb body comprises partition walls made of ceramic as a main component, and a plurality of cells extending from the first end face to the second end face and serving as a flow path of exhaust gas are defined and formed by the partition walls,
the casing comprises a cylindrical pipe provided on an annular inner wall of the central portion of the honeycomb body, a cylindrical member arranged so as to be fitted to an outer circumferential surface of the honeycomb body, and a casing body arranged outside the cylindrical member, forming a path of a heat exchange medium for recovering exhaust heat by heat exchange with the exhaust gas, and comprising a heat exchange medium introduction port into which the heat exchange medium is introduced and a heat exchange medium discharge port from which the heat exchange medium is discharged,
the exhaust branch portion has a branch path that branches the path of the exhaust gas flowing into the honeycomb body into a central portion and an outer circumferential portion in a cross-section orthogonal to an axial direction of the honeycomb body, the exhaust distribution portion has an exhaust distribution mechanism that adjusts a heat recovery amount by changing an airflow resistance of the path of the exhaust gas in the central portion of the honeycomb body and varying the exhaust amount passing through the path of the exhaust gas in the outer circumferential portion of the honeycomb body, and a gap defined between an outer surface of the pipe and the inner wall of the honeycomb body is closed by at least one of a seal member configured to fill the gap, a ring-shaped member contacting the first end face of the honeycomb body, a convex stepped portion of the pipe contacting the first end face of the honeycomb body, a tapered portion of the pipe contacting the first end face of the honeycomb body, or the exhaust branch portion contacting at least one of the first end face of the honeycomb body or the second end face of the honeycomb body.

2. The exhaust heat recovery device according to claim 1, wherein the honeycomb body has an inner wall structure that is continuous in a cylindrical shape inside the hollow central portion.

3. The exhaust heat recovery device according to claim 1, wherein at least one of the exhaust branch portion and the exhaust distribution portion comprises a cylindrical exhaust guide member, and an end face of the exhaust guide member is arranged in a state of being in contact with an end face of the honeycomb body or in a state of being separated from the end face of the honeycomb body.

4. The exhaust heat recovery device according to claim 3, wherein an interval between the exhaust guide member and the end face of the honeycomb body is 0.05 to 10 mm.

5. The exhaust heat recovery device according to claim 1, wherein at least one of the exhaust branch portion and the exhaust distribution portion comprises a cylindrical exhaust guide member, and the exhaust guide member is arranged so as to penetrate the hollow central portion of the honeycomb body.

6. The exhaust heat recovery device according to claim 3, wherein a value of D1/D2, which is a ratio of a diameter D1 of the honeycomb body to a diameter D2 of the exhaust guide member, is 1.1 to 7.

7. The exhaust heat recovery device according to claim 1, wherein the heat exchange portion, the exhaust branch portion, and the exhaust distribution portion are configured to be separable from each other.

8. The exhaust heat recovery device according to claim 1, wherein the exhaust gas that has passed through the outer circumferential surface of the honeycomb body and the exhaust gas that has passed through the central portion of the honeycomb body, among the exhaust gases of which circulating paths are determined by the exhaust distribution mechanism, are discharged from discharge ports of different paths on a downstream side of the honeycomb body.

9. The exhaust heat recovery device according to claim 1, wherein the exhaust gas that has passed through the outer circumferential surface of the honeycomb body and the exhaust gas that has passed through the central portion of the honeycomb body, among the exhaust gases of which circulating paths are determined by the exhaust distribution mechanism, are merged on the downstream side of the honeycomb body and are discharged from a discharge port of a same circulating path.

10. The exhaust heat recovery device according to claim 1, wherein a path of the exhaust gas in the outer circumferential surface of the honeycomb body is partially partitioned in two or more portions in an axial direction of the honeycomb body, and the exhaust gas introduced into the outer circumferential portion is folded back and circulated with respect to an axial direction of the honeycomb body.

11. The exhaust heat recovery device according to claim 1, further comprising an external member provided around the casing and comprising a device accompanying heat generation,
wherein the exhaust heat recovery device is configured to further recover heat generation in the external member and to transfer heat from the exhaust gas to the external member with the heat exchange medium.

12. An exhaust heat recovery device comprising a heat exchange portion, an exhaust branch portion, and an exhaust distribution portion,
wherein the heat exchange portion comprises a pillar-shaped honeycomb body having a first end face and a second end face, and a casing accommodating the honeycomb body,
the honeycomb body comprises partition walls made of ceramic as a main component, and a plurality of cells extending from the first end face to the second end face and serving as a flow path of exhaust gas are defined and formed by the partition walls,
the casing comprises a cylindrical member arranged so as to be fitted to an outer circumferential surface of the honeycomb body, and a casing body arranged outside the cylindrical member, forming a path of a heat exchange medium for recovering exhaust heat by heat exchange with the exhaust gas, and comprising a heat exchange medium introduction port into which the heat exchange medium is introduced and a heat exchange medium discharge port from which the heat exchange medium is discharged,
the exhaust branch portion has a branch path that branches the path of the exhaust gas flowing into the honeycomb body into a central portion and an outer circumferential portion in a cross-section orthogonal to an axial direction of the honeycomb body,
the exhaust distribution portion has an exhaust distribution mechanism that adjusts a heat recovery amount by changing an airflow resistance of the path of the exhaust gas in the central portion of the honeycomb body and varying the exhaust amount passing through the path of the exhaust gas in the outer circumferential portion of the honeycomb body, and
the exhaust branch portion comprises a cylindrical exhaust guide member, and an end face of the exhaust guide member is arranged in a state of being in contact with an end face of the honeycomb body or in a state of being separated from the end face of the honeycomb body.

* * * * *